(12) United States Patent  
Candelore

(10) Patent No.: US 8,488,788 B2
(45) Date of Patent: *Jul. 16, 2013

(54) METHOD FOR SIMULCRYPTING SCRAMBLED DATA TO A PLURALITY OF CONDITIONAL ACCESS DEVICES

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 499 days.

This patent is subject to a terminal disclaimer.

(21) Appl. No.: 12/638,831

(22) Filed: Dec. 15, 2009

(65) Prior Publication Data

US 2010/0183149 A1    Jul. 22, 2010

Related U.S. Application Data

(60) Continuation of application No. 10/209,341, filed on Jul. 30, 2002, now Pat. No. 7,702,589, which is a division of application No. 09/437,590, filed on Nov. 9, 1999, now Pat. No. 7,039,614.

(51) Int. Cl.
*H04N 7/167* (2011.01)
*H04L 9/08* (2006.01)
*G06F 11/30* (2006.01)
*G06F 15/16* (2006.01)

(52) U.S. Cl.
USPC ........... 380/210; 380/286; 713/189; 713/193; 709/219

(58) Field of Classification Search
USPC .. 380/28–30, 44–47, 255–286; 713/150–154, 713/160–167, 189–193
See application file for complete search history.

(56) References Cited

U.S. PATENT DOCUMENTS

| | | |
|---|---|---|
| 3,852,519 A | 12/1974 | Court |
| 4,381,519 A | 4/1983 | Wilkinson et al. |
| 4,419,693 A | 12/1983 | Wilkinson |
| 4,521,853 A | 6/1985 | Guttag |

(Continued)

FOREIGN PATENT DOCUMENTS

| | | |
|---|---|---|
| CA | 2389247 | 5/2001 |
| CA | 2328645 | 7/2001 |

(Continued)

OTHER PUBLICATIONS

"Ad Agencies and Advertisers to Be Empowered with Targeted Ad Delivered by Television's Prevailing Video Servers", *Article Business Section of the New York Times*, (Dec. 20, 2001).
"CLearPlay: The Technology of Choice", from web site, http://www.clearplay.com/what.asp, *ClearPlay* 2001-2003.
"How Networks Work, Millennium Edition", *Que Corporation*, (Sep. 2000), 88-89.
"McCormac Hack Over Cablemodem", *HackWatch*, http://www.hackwatch.com/cablemodbook.html, (Aug. 10, 1998).

(Continued)

*Primary Examiner* — Evans Desrosiers
(74) *Attorney, Agent, or Firm* — Blakely, Sokoloff, Taylor & Zafman LLP

(57) ABSTRACT

One embodiment of the invention relates to an apparatus comprising an input, a descrambler unit and a re-scrambler unit. The input is adapted to receive scrambled content. The descrambler unit is coupled to the input. The descrambler unit descrambles the scrambled content in order to recover unscrambled content and concurrently routes both the unscrambled content over a first communication link for display on a display device and the unscrambled content over a second communication link. The re-scrambler unit is coupled to the second communication link. The re-scrambler unit is adapted to scramble the unscrambled content to produce re-scrambled content for transmission.

19 Claims, 14 Drawing Sheets

U.S. PATENT DOCUMENTS

| | | | |
|---|---|---|---|
| 4,535,355 A * | 8/1985 | Arn et al. ................... 380/212 |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kono |
| 4,785,361 A | 11/1988 | Brotby |
| 4,788,589 A | 11/1988 | Kondo |
| 4,802,215 A | 1/1989 | Mason |
| 4,803,725 A | 2/1989 | Horne et al. |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. |
| 4,953,023 A | 8/1990 | Kondo |
| 4,964,126 A | 10/1990 | Musicus et al. |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,029,208 A * | 7/1991 | Tanaka ................... 380/279 |
| 5,091,936 A | 2/1992 | Katznelson et al. |
| 5,111,504 A | 5/1992 | Esserman et al. |
| 5,122,873 A | 6/1992 | Golin |
| 5,124,117 A | 6/1992 | Tatebayashi et al. |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski et al. |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Dillon et al. |
| 5,663,764 A | 9/1997 | Kondo et al. |
| 5,666,293 A | 9/1997 | Metz et al. |
| 5,671,276 A | 9/1997 | Eyer et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis |
| 5,726,702 A | 3/1998 | Hamaguchi et al. |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,757,417 A | 5/1998 | Aras et al. |
| 5,757,909 A | 5/1998 | Park |
| 5,768,539 A | 6/1998 | Metz et al. |
| 5,784,464 A | 7/1998 | Akiyama et al. |
| 5,787,171 A | 7/1998 | Kubota et al. |
| 5,787,179 A | 7/1998 | Ogawa et al. |
| 5,790,842 A | 8/1998 | Charles et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,897,218 A | 4/1999 | Nishimura et al. |
| 5,915,018 A | 6/1999 | Aucsmith |
| 5,917,830 A | 6/1999 | Chen et al. |
| 5,917,915 A | 6/1999 | Hirose |
| 5,922,048 A | 7/1999 | Emura |
| 5,923,486 A | 7/1999 | Sugiyama et al. |
| 5,923,755 A | 7/1999 | Birch |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,973,722 A | 10/1999 | Wakai et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Isibashi |
| 6,021,201 A | 2/2000 | Bakhle et al. |
| 6,026,164 A | 2/2000 | Sakamoto et al. |
| 6,028,932 A | 2/2000 | Park |
| 6,029,045 A | 2/2000 | Picco et al. |

| | | | |
|---|---|---|---|
| 6,049,289 A | 4/2000 | Waggamon et al. | |
| 6,049,613 A | 4/2000 | Jakobsson | |
| 6,055,314 A | 4/2000 | Spies et al. | |
| 6,055,315 A | 4/2000 | Doyle et al. | |
| 6,057,872 A | 5/2000 | Candelore | |
| 6,058,186 A | 5/2000 | Enari | |
| 6,058,192 A | 5/2000 | Guralnick et al. | |
| 6,061,451 A | 5/2000 | Muratani et al. | |
| 6,061,541 A | 5/2000 | Bessette | |
| 6,064,748 A | 5/2000 | Hogan | |
| 6,065,050 A | 5/2000 | DeMoney | |
| 6,069,647 A | 5/2000 | Sullivan et al. | |
| 6,072,872 A | 6/2000 | Chang et al. | |
| 6,072,873 A | 6/2000 | Bewick | |
| 6,073,122 A | 6/2000 | Wool | |
| 6,088,450 A | 7/2000 | Davis et al. | |
| 6,105,134 A | 8/2000 | Pinder et al. | |
| 6,108,422 A | 8/2000 | Newby et al. | |
| 6,115,821 A | 9/2000 | Newby et al. | |
| 6,118,873 A | 9/2000 | Lotspiech et al. | |
| 6,125,349 A | 9/2000 | Maher | |
| 6,134,237 A | 10/2000 | Brailean et al. | |
| 6,134,551 A | 10/2000 | Aucsmith | |
| 6,138,237 A | 10/2000 | Ruben et al. | |
| 6,154,206 A | 11/2000 | Ludtke | |
| 6,157,719 A | 12/2000 | Wasilewski et al. | |
| 6,178,242 B1 | 1/2001 | Tsuria | |
| 6,181,334 B1 | 1/2001 | Freeman et al. | |
| 6,185,369 B1 | 2/2001 | Ko et al. | |
| 6,185,546 B1 | 2/2001 | Davis | |
| 6,189,096 B1 | 2/2001 | Haverty | |
| 6,192,131 B1 | 2/2001 | Geer, Jr. et al. | |
| 6,199,053 B1 | 3/2001 | Herbert et al. | |
| 6,202,151 B1 | 3/2001 | Musgrave et al. | |
| 6,204,843 B1 | 3/2001 | Freeman et al. | |
| 6,209,098 B1 | 3/2001 | Davis | |
| 6,215,484 B1 | 4/2001 | Freeman et al. | |
| 6,222,924 B1 | 4/2001 | Salomaki | |
| 6,223,290 B1 | 4/2001 | Larsen et al. | |
| 6,226,618 B1 | 5/2001 | Downs et al. | |
| 6,229,895 B1 | 5/2001 | Son et al. | |
| 6,230,194 B1 | 5/2001 | Frailong et al. | |
| 6,230,266 B1 | 5/2001 | Perlman et al. | |
| 6,233,577 B1 | 5/2001 | Ramasubramani et al. | |
| 6,236,727 B1 | 5/2001 | Ciacelli et al. | |
| 6,240,553 B1 | 5/2001 | Son et al. | |
| 6,246,720 B1 | 6/2001 | Kutner et al. | |
| 6,247,127 B1 | 6/2001 | Vandergeest | |
| 6,256,747 B1 | 7/2001 | Inohara et al. | |
| 6,263,506 B1 | 7/2001 | Ezaki et al. | |
| 6,266,416 B1 | 7/2001 | Sigbjørnsen et al. | |
| 6,266,480 B1 | 7/2001 | Ezaki et al. | |
| 6,272,538 B1 | 8/2001 | Holden et al. | |
| 6,278,783 B1 | 8/2001 | Kocher et al. | |
| 6,289,455 B1 | 9/2001 | Kocher et al. | |
| 6,292,568 B1 | 9/2001 | Akins et al. | |
| 6,292,892 B1 | 9/2001 | Davis | |
| 6,307,939 B1 | 10/2001 | Vigarie | |
| 6,311,012 B1 | 10/2001 | Cho et al. | |
| 6,324,288 B1 | 11/2001 | Hoffman | |
| 6,330,672 B1 | 12/2001 | Shur | |
| 6,351,538 B1 | 2/2002 | Uz | |
| 6,351,813 B1 | 2/2002 | Mooney et al. | |
| 6,377,589 B1 | 4/2002 | Knight et al. | |
| 6,378,130 B1 | 4/2002 | Adams | |
| 6,389,533 B1 | 5/2002 | Davis et al. | |
| 6,389,537 B1 | 5/2002 | Davis et al. | |
| 6,408,390 B1 * | 6/2002 | Saito | 713/193 |
| 6,415,031 B1 | 7/2002 | Colligan et al. | |
| 6,415,101 B1 | 7/2002 | deCarmo et al. | |
| 6,418,169 B1 | 7/2002 | Datari | |
| 6,424,717 B1 | 7/2002 | Pinder et al. | |
| 6,430,361 B2 | 8/2002 | Lee | |
| 6,442,689 B1 | 8/2002 | Kocher | |
| 6,445,738 B1 | 9/2002 | Zdepski et al. | |
| 6,449,718 B1 | 9/2002 | Rucklidge et al. | |
| 6,452,923 B1 | 9/2002 | Gerszberg et al. | |
| 6,453,115 B1 | 9/2002 | Boyle | |
| 6,456,985 B1 | 9/2002 | Ohtsuka | |
| 6,459,427 B1 | 10/2002 | Mao et al. | |
| 6,463,152 B1 | 10/2002 | Takahashi | |
| 6,466,671 B1 | 10/2002 | Maillard et al. | |
| 6,477,649 B2 | 11/2002 | Kambayashi et al. | |
| 6,487,646 B1 | 11/2002 | Adams et al. | |
| 6,505,032 B1 | 1/2003 | McCorkle et al. | |
| 6,510,554 B1 | 1/2003 | Gordon et al. | |
| 6,519,248 B1 | 2/2003 | Valko | |
| 6,519,693 B1 | 2/2003 | Debey | |
| 6,526,144 B2 | 2/2003 | Markandey et al. | |
| 6,529,526 B1 | 3/2003 | Schneidewend | |
| 6,543,053 B1 | 4/2003 | Li et al. | |
| 6,549,229 B1 | 4/2003 | Kirby et al. | |
| 6,550,008 B1 | 4/2003 | Zhang et al. | |
| 6,557,031 B1 | 4/2003 | Mimura et al. | |
| 6,587,561 B1 | 7/2003 | Sered et al. | |
| 6,590,979 B1 | 7/2003 | Ryan | |
| 6,609,039 B1 | 8/2003 | Schoen | |
| 6,640,145 B2 | 10/2003 | Hoffberg et al. | |
| 6,640,305 B2 | 10/2003 | Kocher et al. | |
| 6,643,298 B1 | 11/2003 | Brunheroto et al. | |
| 6,650,754 B2 | 11/2003 | Akiyama et al. | |
| 6,654,389 B1 | 11/2003 | Brunheroto et al. | |
| 6,678,740 B1 | 1/2004 | Rakib et al. | |
| 6,681,326 B2 | 1/2004 | Son et al. | |
| 6,693,965 B1 | 2/2004 | Inoue et al. | |
| 6,697,489 B1 | 2/2004 | Candelore | |
| 6,697,944 B1 | 2/2004 | Jones et al. | |
| 6,698,020 B1 | 2/2004 | Zigmond et al. | |
| 6,707,696 B1 | 3/2004 | Turner et al. | |
| 6,714,650 B1 | 3/2004 | Maillard et al. | |
| 6,732,367 B1 | 5/2004 | Ellis et al. | |
| 6,754,276 B1 | 6/2004 | Harumoto et al. | |
| 6,772,340 B1 | 8/2004 | Peinado et al. | |
| 6,784,464 B2 | 8/2004 | Ichikawa et al. | |
| 6,788,690 B2 | 9/2004 | Harri | |
| 6,788,882 B1 | 9/2004 | Geer et al. | |
| 6,826,185 B1 | 11/2004 | Montanaro et al. | |
| 6,834,110 B1 | 12/2004 | Marconcini et al. | |
| 6,895,128 B2 | 5/2005 | Bohnenkamp | |
| 6,904,520 B1 | 6/2005 | Rosset et al. | |
| 6,917,684 B1 | 7/2005 | Tatebayashi et al. | |
| 6,931,534 B1 | 8/2005 | Jandel et al. | |
| 6,938,162 B1 | 8/2005 | Nagai et al. | |
| 6,964,060 B2 | 11/2005 | Kamperman et al. | |
| 6,976,166 B2 | 12/2005 | Herley et al. | |
| 6,996,722 B1 | 2/2006 | Fairman et al. | |
| 7,010,685 B1 | 3/2006 | Candelore | |
| 7,039,802 B1 | 5/2006 | Eskicioglu et al. | |
| 7,039,938 B2 | 5/2006 | Candelore | |
| 7,058,806 B2 | 6/2006 | Smeets et al. | |
| 7,065,213 B2 | 6/2006 | Pinder | |
| 7,120,250 B2 | 10/2006 | Candelore | |
| 7,124,303 B2 | 10/2006 | Candelore et al. | |
| 7,124,938 B1 | 10/2006 | Marsh | |
| 7,127,619 B2 | 10/2006 | Unger et al. | |
| 7,139,398 B2 | 11/2006 | Candelore et al. | |
| 7,143,289 B2 | 11/2006 | Denning et al. | |
| 7,146,007 B1 | 12/2006 | Maruo et al. | |
| 7,151,831 B2 | 12/2006 | Candelore et al. | |
| 7,155,012 B2 | 12/2006 | Candelore et al. | |
| 7,194,092 B1 | 3/2007 | England et al. | |
| 7,203,311 B1 | 4/2007 | Kahn et al. | |
| 7,239,709 B1 | 7/2007 | Yamada et al. | |
| 7,242,766 B1 | 7/2007 | Lyle | |
| 7,254,234 B2 | 8/2007 | Sugahara et al. | |
| 7,333,489 B1 | 2/2008 | Nelson et al. | |
| 7,353,541 B1 | 4/2008 | Ishibashi et al. | |
| 7,363,276 B2 | 4/2008 | Akiyama | |
| 7,379,548 B2 | 5/2008 | Revital et al. | |
| 7,500,258 B1 | 3/2009 | Eldering | |
| 7,860,131 B1 | 12/2010 | Harvey et al. | |
| 2001/0011349 A1 * | 8/2001 | Garrison | 713/165 |
| 2001/0030959 A1 | 10/2001 | Ozawa et al. | |
| 2001/0036271 A1 | 11/2001 | Javed | |
| 2001/0042043 A1 | 11/2001 | Shear et al. | |
| 2002/0003881 A1 | 1/2002 | Reitmeier et al. | |
| 2002/0021805 A1 | 2/2002 | Schumann et al. | |
| 2002/0026587 A1 | 2/2002 | Talstra et al. | |

| | | | | | | |
|---|---|---|---|---|---|---|
| 2002/0044658 A1 | 4/2002 | Wasilewski et al. | | 2004/0100510 A1 | 5/2004 | Milic-Frayling et al. |
| 2002/0046406 A1 | 4/2002 | Chelehmal et al. | | 2004/0111613 A1 | 6/2004 | Shen-Orr et al. |
| 2002/0047915 A1 | 4/2002 | Misu | | 2004/0123094 A1 | 6/2004 | Sprunk |
| 2002/0059425 A1 | 5/2002 | Belfiore et al. | | 2004/0136532 A1 | 7/2004 | Pinder et al. |
| 2002/0066101 A1 | 5/2002 | Gordon et al. | | 2004/0139337 A1 | 7/2004 | Pinder et al. |
| 2002/0083438 A1 | 6/2002 | So et al. | | 2004/0141314 A1 | 7/2004 | Vautrin et al. |
| 2002/0083439 A1 | 6/2002 | Eldering | | 2004/0158721 A1 | 8/2004 | Candelore |
| 2002/0090090 A1 | 7/2002 | Van Rijnsoever et al. | | 2004/0165586 A1 | 8/2004 | Read et al. |
| 2002/0094084 A1 | 7/2002 | Wasilewski et al. | | 2004/0181666 A1 | 9/2004 | Candelore |
| 2002/0097322 A1 | 7/2002 | Monroe et al. | | 2004/0187161 A1 | 9/2004 | Cao |
| 2002/0108035 A1 | 8/2002 | Herley et al. | | 2004/0240668 A1 | 12/2004 | Bonan et al. |
| 2002/0109707 A1 | 8/2002 | Lao et al. | | 2004/0267602 A1 | 12/2004 | Gaydos et al. |
| 2002/0116705 A1 | 8/2002 | Perlman et al. | | 2005/0004875 A1 | 1/2005 | Kontio et al. |
| 2002/0120838 A1 | 8/2002 | Abdulkader | | 2005/0021941 A1 | 1/2005 | Ohmori et al. |
| 2002/0126890 A1 | 9/2002 | Katayama et al. | | 2005/0028193 A1 | 2/2005 | Candelore et al. |
| 2002/0129243 A1 | 9/2002 | Nanjundiah | | 2005/0036067 A1 | 2/2005 | Ryal et al. |
| 2002/0150239 A1 | 10/2002 | Carny et al. | | 2005/0063541 A1 | 3/2005 | Candelore |
| 2002/0164022 A1 | 11/2002 | Strasser et al. | | 2005/0066357 A1 | 3/2005 | Ryal |
| 2002/0170053 A1 | 11/2002 | Peterka et al. | | 2005/0094808 A1 | 5/2005 | Pedlow, Jr. et al. |
| 2002/0184506 A1 | 12/2002 | Perlman | | 2005/0094809 A1 | 5/2005 | Pedlow, Jr. et al. |
| 2002/0188567 A1 | 12/2002 | Candelore | | 2005/0097596 A1 | 5/2005 | Pedlow, Jr. |
| 2002/0194613 A1 | 12/2002 | Unger | | 2005/0097597 A1 | 5/2005 | Pedlow, Jr. et al. |
| 2002/0196939 A1 | 12/2002 | Unger et al. | | 2005/0097598 A1 | 5/2005 | Pedlow, Jr. et al. |
| 2003/0009669 A1 | 1/2003 | White et al. | | 2005/0097614 A1 | 5/2005 | Pedlow, Jr. et al. |
| 2003/0021412 A1 | 1/2003 | Candelore et al. | | 2005/0102702 A1 | 5/2005 | Candelore et al. |
| 2003/0025423 A1 | 2/2003 | Miller et al. | | 2005/0129233 A1 | 6/2005 | Pedlow, Jr. |
| 2003/0026423 A1 | 2/2003 | Unger et al. | | 2005/0141713 A1 | 6/2005 | Genevois |
| 2003/0026523 A1 | 2/2003 | Chua et al. | | 2005/0144646 A1 | 6/2005 | Lecrom et al. |
| 2003/0035540 A1 | 2/2003 | Freeman et al. | | 2005/0169473 A1 | 8/2005 | Candelore |
| 2003/0035543 A1 | 2/2003 | Gillon et al. | | 2005/0192904 A1 | 9/2005 | Candelore |
| 2003/0046686 A1 | 3/2003 | Candelore et al. | | 2006/0026926 A1 | 2/2006 | Triel et al. |
| 2003/0059047 A1 | 3/2003 | Iwamura | | 2006/0029060 A1 | 2/2006 | Pister |
| 2003/0063615 A1 | 4/2003 | Iuoma et al. | | 2006/0112344 A1 | 5/2006 | Ducheneaut et al. |
| 2003/0072555 A1 | 4/2003 | Yap et al. | | 2006/0115083 A1 | 6/2006 | Candelore et al. |
| 2003/0078891 A1 | 4/2003 | Capitant | | 2006/0130119 A1 | 6/2006 | Candelore et al. |
| 2003/0081630 A1 | 5/2003 | Mowery et al. | | 2006/0130121 A1 | 6/2006 | Candelore et al. |
| 2003/0081776 A1 | 5/2003 | Candelore | | 2006/0136976 A1 | 6/2006 | Coupe et al. |
| 2003/0084284 A1 | 5/2003 | Ando et al. | | 2006/0143655 A1 | 6/2006 | Ellis et al. |
| 2003/0097662 A1 | 5/2003 | Russ et al. | | 2006/0153379 A1 | 7/2006 | Candelore et al. |
| 2003/0104717 A1 | 6/2003 | Hayakawa | | 2006/0168616 A1 | 7/2006 | Candelore |
| 2003/0108199 A1 | 6/2003 | Pinder et al. | | 2006/0174264 A1 | 8/2006 | Candelore |
| 2003/0115595 A1 | 6/2003 | Stevens et al. | | 2007/0028264 A1 | 2/2007 | Lowe |
| 2003/0123664 A1 | 7/2003 | Pedlow, Jr. et al. | | 2008/0127251 A1 | 5/2008 | Wachtfogel et al. |
| 2003/0123849 A1 | 7/2003 | Nallur et al. | | | | |
| 2003/0133570 A1 | 7/2003 | Candelore et al. | | FOREIGN PATENT DOCUMENTS | | |
| 2003/0145329 A1 | 7/2003 | Candelore | | EP | 0471373 | 2/1992 |
| 2003/0152224 A1 | 8/2003 | Candelore et al. | | EP | 0527611 | 7/1992 |
| 2003/0152226 A1 | 8/2003 | Candelore et al. | | EP | 0558016 | 2/1993 |
| 2003/0156718 A1 | 8/2003 | Candelore et al. | | EP | 0596826 | 4/1993 |
| 2003/0157140 A1 | 8/2003 | Takada | | EP | 0610587 | 12/1993 |
| 2003/0159139 A1 | 8/2003 | Candelore et al. | | EP | 0680209 | 4/1995 |
| 2003/0159140 A1 | 8/2003 | Candelore | | EP | 0674440 | 9/1995 |
| 2003/0159152 A1 | 8/2003 | Lin et al. | | EP | 0674441 | 9/1995 |
| 2003/0174837 A1 | 9/2003 | Candelore et al. | | EP | 0720374 | 7/1996 |
| 2003/0174844 A1 | 9/2003 | Candelore | | EP | 0382764 | 4/1997 |
| 2003/0188164 A1 | 10/2003 | Okimoto et al. | | EP | 0833517 | 4/1998 |
| 2003/0190054 A1 | 10/2003 | Troyansky et al. | | EP | 0866615 | 9/1998 |
| 2003/0198223 A1 | 10/2003 | Mack et al. | | EP | 1187483 | 3/2002 |
| 2003/0204717 A1 | 10/2003 | Kuehnel | | JP | 07-046575 | 2/1995 |
| 2003/0222994 A1 | 12/2003 | Dawson | | JP | 7067028 | 3/1995 |
| 2003/0226149 A1 | 12/2003 | Chun et al. | | JP | 10011117 | 1/1998 |
| 2004/0003008 A1 | 1/2004 | Wasilewski et al. | | JP | 10164052 | 6/1998 |
| 2004/0021764 A1 | 2/2004 | Driscoll, Jr. et al. | | JP | 11159162 | 6/1999 |
| 2004/0037421 A1 | 2/2004 | Truman | | JP | 11243534 | 9/1999 |
| 2004/0042516 A1 | 3/2004 | Takaki et al. | | JP | 11331805 | 11/1999 |
| 2004/0047470 A1 | 3/2004 | Candelore | | JP | 2000357005 | 12/2000 |
| 2004/0049688 A1 | 3/2004 | Candelore et al. | | JP | 2002540736 | 11/2002 |
| 2004/0049690 A1 | 3/2004 | Candelore et al. | | JP | 2003518841 | 6/2003 |
| 2004/0049691 A1 | 3/2004 | Candelore et al. | | JP | 2003330897 | 11/2003 |
| 2004/0049694 A1 | 3/2004 | Candelore | | JP | 2004264971 | 9/2004 |
| 2004/0064688 A1 | 4/2004 | Jacobs | | JP | 2008514123 | 5/2008 |
| 2004/0066440 A1 | 4/2004 | Porato | | WO | WO-86/07224 | 12/1986 |
| 2004/0073917 A1 | 4/2004 | Pedlow, Jr. et al. | | WO | WO8607224 | 12/1986 |
| 2004/0078575 A1 | 4/2004 | Morten et al. | | WO | WO-8902682 | 3/1989 |
| 2004/0086127 A1 | 5/2004 | Candelore | | WO | WO-93/09525 | 5/1993 |
| 2004/0088541 A1 | 5/2004 | Messerges | | WO | WO-94/10775 | 5/1994 |
| 2004/0088552 A1 | 5/2004 | Candelore | | WO | WO-97/38530 | 10/1997 |
| 2004/0088558 A1 | 5/2004 | Candelore | | WO | WO-00/31964 | 6/2000 |
| 2004/0093494 A1 | 5/2004 | Nishimoto et al. | | WO | WO 0031964 | 6/2000 |

| WO | WO-00/51039 | 8/2000 |
| WO | WO-00/59203 | 10/2000 |
| WO | WO-01/11819 | 2/2001 |
| WO | WO-01/26372 | 4/2001 |
| WO | WO-01/65762 | 9/2001 |
| WO | WO-01/78386 | 10/2001 |
| WO | WO-2004042516 | 5/2004 |
| WO | WO-2004042955 | 5/2004 |
| WO | WO-2006041590 | 4/2006 |

OTHER PUBLICATIONS

"Message Authentication with Partial Encryption", Research disclosure RD 296086, (Dec. 10, 1988).

"Metro Media PVR-DVD-MP3-Web", *Internet publication from* www.metrolink.com, (undated).

"MPEG-2 Digital Broadcast Pocket Guide", vol. 6 Revised, *Aeterna, LLC.*, Germantown, Maryland USA., (2001), 1-59.

"New Digital Copy protection Proposal Would Secure Authorized Copies", *PR Newswire*, (Nov. 13, 1998), 1-3.

"Passage Freedom to Choose", *Sony Electronics Inc.*, (2003).

"Pre-Encryption Profiles—Concept Overview and Proposal", Rev. 1.2 as *submitted to the Open CAS consortium* on Dec. 28, 2000., (Dec. 28, 2000).

Agi, Iskender, et al., "An Empirical Study of Secure MPEG Video Transmissions", *IEEE*, Proceedings of SNDSS 96, (1996), 137-144.

Alattar, Adnan, et al., "Evaluation of Selective Encryption Techniques for Secure Transmission of MPEG-Compressed Bit-Streams", *IEEE*, (1999), IV-340 to IV-343.

Alattar, Adnan M., et al., "Improved Selective Encryption Techniques for Secure Transmission of MPEG Video Bit-Streams", *IEEE*, (1999), 256-260.

Aravind, H., et al., "Image and Video Coding Standards", *AT&T Technical Journal*, (Jan./Feb. 1993), 67-68.

Benini, Luca, et al., "Energy-Efficient Data Acrambling on Memory-Processor Interfaces", *ISPED'03*, Aug. 25-27, 2003, Seoul, Korea, (2003), 26-29.

Brown, Jessica, "The Interactive Commercial, Coming Soon to a TV Near You".

Dittmann, Jana, et al., "Multimedia and Security Workshop at ACM Multimedia", Bristol, U.K., (Sep. 1998).

Dondeti, Lakshminath R., et al., "A Dual Encryption Protocol for Scalable Secure Multicasting", *1999 International Symposium on Computers and Communication*, Jul. 6-8, 1999.

Gonzalez, R. C., et al., "Digital Image Processing", *Addison Wesley Publishing Company, Inc.*, (1992), 346-348.

Gulwani, Sumit, "A Report on Security Issues in Multimedia", *Department of Computer Science and Engineering, Indian Institute of Technology Kanpur*, Course Notes, (Apr. 30, 2000), pp. 10-14.

Haberman, Seth, "Visible World—A High Impact Approach to Customized Television Advertising", (Dec. 2001).

Kim, et al., "Bit Rate Reduction Algorithm for a Digital VCR", *IEEE Transactions on Consumer Electronics*, vol. 37, No. 3, (Aug. 1, 1992), 267-274.

Koenen, Rob H., et al., "The Long March to Interoperable Digital Rights Management", *IEEE*, (2004), 1-17.

Kondo, et al., "A New Concealment Method for Digital VCRs", *IEEE Visual Signal Processing and Communication*, Melbourne, Australia, (Sep. 1993), 20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", *Sony Corporation*, (1991).

Kunkelmann, Thomas, "Applying Encryption to Video Communication", *Multimedia and Security Workshop at ACM Multimedia ?98.* Bristol, U.K., (Sep. 1998), 41-47.

Liu, Zheng, et al., "Motion Vector Encryption in Multimedia Streaming", *Proccedings of the 10th International Multimedia Modeling Conference 2004 IEEE*, (2004), 1-8.

Lookabaugh, Tom, et al., "Selective Encryption and MPEG-2", *ACM Multimedia '03*, (Nov. 2003).

Menezes, Alfred J., et al., "Handbook of Applied Cryptography", *CRC Press*, (Oct. 1996), 551-553.

Naor, Moni, et al., "Certificate Revocation and Certificate update", Apr. 2000, *IEEE Journal on Selected Areas in Communications, IEEE*, vol. 18, No. 4, (2000), 561-570.

Ncube, "Digital Program Insertion", (May 2001).

Ncube, "Smooth Ad Insertion Deployment Protects Revenues", (2004).

NHK Laboratories Note, "Error Correction, Concealment and Shuffling", No. 424, (Mar. 1994), 29-44.

OpenTV, "OpenTV to Showcase Several Advanced Interactive Television Solutions at IBC 2004", (Sep. 6, 2004).

Park, et al., "A Simple Concealment for ATM Bursty Cell Loss", *IEEE Transactions on Consumer Electronics*, No. 3, (Aug. 1993), 704-709.

Park, Joon S., et al., "Binding Identities and Attributes Using Digitally Singed Certificates", *IEEE*, (2000).

Pazarci, Melih, et al., "Data Embedding in Scrambled Digital Video", *Computers and Communication Proceedings, Eighth IEEE International Symposium on 2003*, vol. 1 (*ISCC 2003*, (2003), 498-503.

Piazza, Peter, "E-Signed, Sealed, and Delivered", *Security Management*, vol. 45, No. 4 (Apr. 2001), 72-77.

Qiao, Lintian, et al., "Comparison of MPEG Encryption Algorithms", *Department of Computer Science, University of Illinois at Urbana-Champaign*, (Jan. 17, 1998), 1-20.

Robert, Arnaud, et al., "Digital Cable: The Key to Your Content", *Access Intelligence's Cable Group*, online at http:www.cableworld.com/ct/archives/0202/0202digitalrights.htm, (Feb. 2002).

Rosenblatt, Bill, "Coral Consortium Aims to Make DRM Interoperable", online at http://www.drmwatch.com/standards/article.php/3418741, (Oct. 4, 2004).

Seachange International, "Dynamic-Customized TV Advertising Creation and Production Tools", *Web Site Literature*, (1998).

Seachange International, "Transport Streams Insertion of Video in the Compressed Digital Domain", *Web Site Literature*, (2000).

Shavik, Kirstnamurthy, "Securant Technologies Delivers Broad PKI Integration to Enable Standards Based Security", *Business Wires*, (Oct. 4, 1999).

Shi, Changgui, et al., "An Efficient MPEG Video Encryption Algorithm", *1998 IEEE, Department of Computer Sciences*, Purdue University, West Lafayette, IN, 381-386.

Spanos, George A., et al., "Performance Study of a Selective Encryption Scheme for the Security of Networked, Real-Time Video", *IEEE*, (1995), 2-10.

Taylor, Jim, "DVD Demystified—The Guidebook for DVD-Video and DVD-ROM", Pub. McGraw-Hill, ISBN: 0-07-064841-7, pp. 134-147, (1998), 134-147.

Thawani, Amit, et al., "Context Aware Personalized Ad Insertion in an Interactive TV Environment", 2004.

Tom, et al., "Packet Video for Cell Loss Protection Using Deinterleaving and Scrambling", *ICASSP 91: 1991 International Conference on Acoustics, Speech and Signal Processing*, vol. 4, (Apr. 1991), 2857-2860.

Wu, Chung-Ping, et al., "Fast Encryption Methods for Audiovisual Data Confidentiality", *SPIE International Symposia on Information Technologies* (Boston, Ma., USA) (Nov. 2000), 284-295.

Wu, S. Felix, et al., "Run-Time Performance Evaluation for a Secure MPEG System Supporting Both Selective Watermarking and Encryption", *submitted to JSAC special issue on Copyright and Privacy Protection*, (Mar. 1, 1997).

Wu, Tsung-Li, et al., "Selective Encryption and Watermarking of MPEG Video (Extended Abstract)", *International Conference on Image Science, Systems, and Technology, CISST?97*, (Feb. 17, 1997).

Zeng, Wenjun, et al., "Efficient Frequency Domain Video Scrambling for Content Access Control", In *Proc. ACM Multimedia*, (Nov. 1999).

Zhu, et al., "Coding and Cell-Loss Recovery in DCT-Based Packet Video", *IEEE Transactions on Circuits and Systems for Video Technology*, No. 3, NY, (Jun. 3, 1993).

\* cited by examiner

METHOD FOR SIMULCRYPTING SCRAMBLED DATA TO A PLURALITY OF CONDITIONAL ACCESS DEVICES

CROSS-REFERENCE TO RELATED APPLICATIONS

This application is a Continuation of application Ser. No. 10/209,341, filed Jul. 30, 2002, now U.S. Pat. No. 7,702,589, which is a Divisional based upon and claims the benefit of priority from Ser. No. 09/437,590, filed Nov. 9, 1999, now U.S. Pat. No. 7,039,614, the entire contents of which are incorporated herein by reference.

BACKGROUND OF THE INVENTION

1. Field of the Invention

The present invention relates to digital devices. More specifically, the present invention relates to a copy management system and method for controlling the reproduction and recording of digital content on and from at least one digital device.

2. General Background

Analog communication systems are rapidly giving way to their digital counterparts. Digital television is currently scheduled to be available nationally to all consumers by the year 2002 and completely in place by the year 2006. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to, this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who desire to prevent the unauthorized and uncontrolled copying of copyrighted, or otherwise protected, material.

In response, there is a movement to require service providers, such as terrestrial broadcast, cable and direct broadcast satellite (DBS) companies, and companies having Internet sites which provide downloadable content, to introduce protection schemes. Two such copy protection systems have been proposed by the 5C group of the Data Hiding Sub Group (DHSG) (5C comprising representatives of Sony, Hitachi, Toshiba, Matsushita, and Intel) and the Data Transmission Discussion Group (DTDG), which are industry committee subgroups of the Copy Protection Technical Working Group (CPTWG). The CPTWG represents the content providers, computer and consumer electronic product manufacturers.

The DTDG Digital Transmission Copy Protection (DTCP) proposal is targeted for protecting copy-protected digital content, which is transferred between digital devices connected via a digital transmission medium such as an IEEE 1394 serial bus. Device-based, the proposal uses symmetric key cryptographic techniques to encode components of a compliant device. This allows for the authentication of any digital device prior to the transmission of the digital content in order to determine whether the device is compliant. The digital content is itself encoded prior to transmission so that unauthorized copying of the content will result in copy having an unintelligible format.

One method of encoding the content has been proposed by the DHSG, and is based on watermarking techniques. Although the main focus of the DHSG proposal has been for copy protection of digital movie and video content, particularly as applied to DVD systems, it is expected to be applicable to the copy protection of any digital content distributed electronically via digital broadcasts and networks. The watermarking techniques, which are invisible to the user, allow the incoming content to be marked in a manner that makes it extremely difficult to discern precisely how the content was encoded, and thus extremely difficult to remove or alter the watermark without damaging the content. The DHSG has determined three primary cases of detection and control that such a technology should accomplish: playback, record and generational copy control. It is anticipated that the watermarking technology will allow the content provider to specify at least whether the content is "copy never," "copy once," and "copy free" content. "Copy never" is used to mark digital content to indicate that the content is not allowed to be copied, while "copy free" indicates that the content may be copied freely and which can be marked with additional information. This is different than material that is never marked. Finally, "copy once" is used to indicate that the digital content is allowed to be copied only once. As a copy is being made, the original "copy once" content and the newly copied content are re-marked with "no more copy." Of course, other types of copy management commands may limit the playing or reproduction of such digital content; for example, to a specific period of time, duration, or number of plays or viewings.

Thus, even today, the functionality of digital devices such as set-top boxes, digital televisions, digital audio players, and similar such digital devices extends beyond their historical role of conditional access (CA), i.e., merely descrambling content to a CA-clear format for real-time viewing and/or listening, and now include constraints and conditions on the recording and playback of such digital content. For example, currently, copying of scrambled content for subsequent descrambling and viewing or listening may be permitted with the appropriate service/content provider authorization or key provided to the digital device.

A disadvantage of such digital devices is that do not allow the simultaneous viewing of content in a CA descrambled format (hereinafter referred to as "descrambled content") and the recording of content in a CA-scrambled content (hereinafter referred to as "scrambled content"), both of which are typically copy-protected, using, for example, some sort of watermarking process, as proposed by the DHSG. Thus, the digital devices support either the viewing of descrambled content or the recording of such scrambled content, but not both. Additionally, in those instances where the digital device is connected to other digital devices over a transmission medium via a digital interface, there may also be additional encoding at the digital interface prior to input into the transmission medium; e.g., using the 5C-proposed copy-protection scheme. In such cases, the viewable form, e.g., descrambled content, with "copy never" attributes would not be recordable by downstream devices. However, the non-viewable, or scrambled, content would typically have "copy free" attributes. As the simultaneous viewing of descrambled content and the recording of scrambled content is not possible under these scenarios, it is difficult to "time shift" copy-protected content and impossible to record a scrambled program while it is being viewed, even though such recording is for the viewer's/listener's sole entertainment at a later point in time. Both are considered desirable by viewers, listeners and other consumers.

Therefore, in view of the interests of the aforementioned viewers, listeners and other consumers, it would be desirable to provide a system that allows for the simultaneous viewing, listening or playing of descrambled content and recording of the scrambled content which also addressed the concerns of the various content providers.

SUMMARY

In accordance with an embodiment of the present invention, a method for storing a normal scrambled digital program is provided. The method includes receiving a scrambled program, and receiving a plurality of access requirements. Each access requirement can descramble the scrambled program. The method also includes selecting at least one of the access requirements, and storing the scrambled program and the selected requirement.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
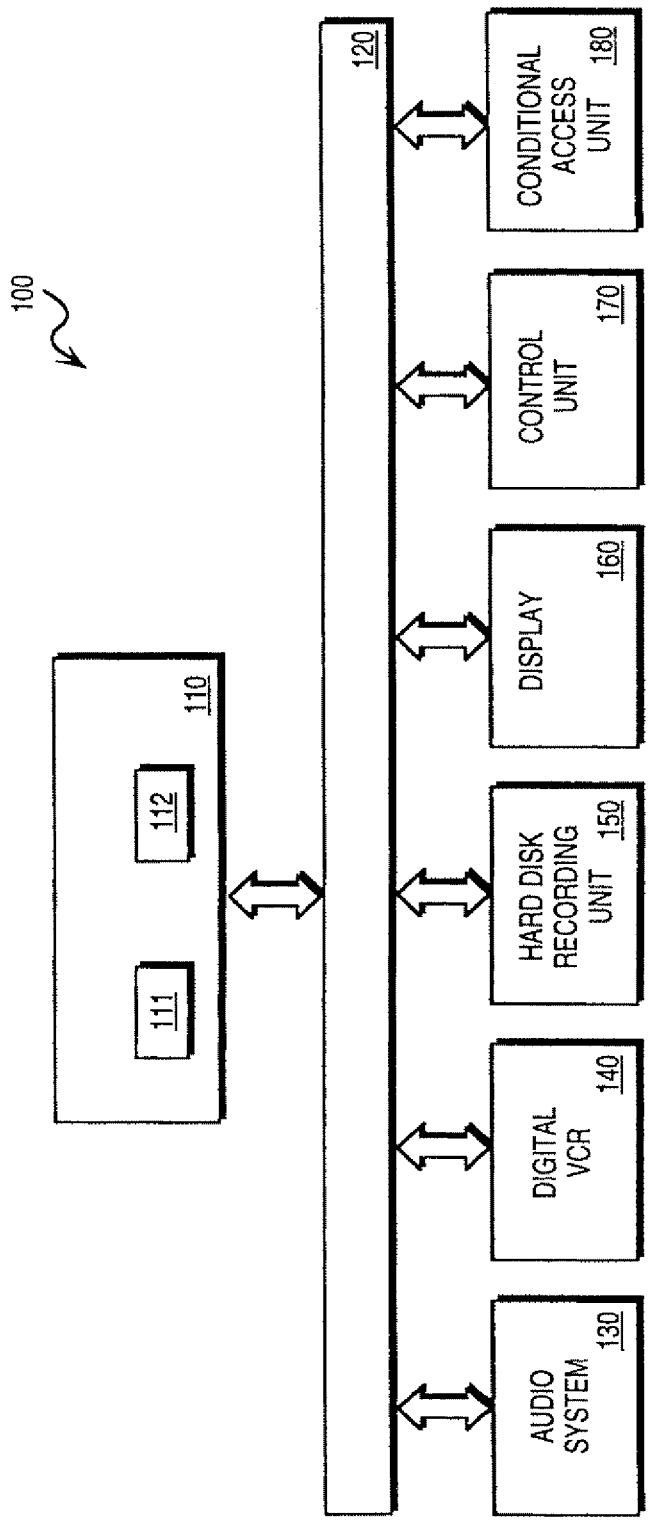
FIG. 1 is a block diagram of an exemplary entertainment system including one embodiment of a digital device.

FIG. 1 is a block diagram of an entertainment system 100 including one embodiment of the copy management system of the present invention. The entertainment system 100 includes a digital device 110 for receiving a digital bitstream including program data from one or more service providers. Such service or content providers can include terrestrial broadcasters, cable operators, direct broadcast satellite (DBS) companies, companies providing content for download via the Internet, or any similar such content and/or service provider. The program data may include system information, entitlement control messages, entitlement management messages, content, and other data, each of which will be described briefly. System information may include information on program names, time of broadcast, source, and a method of retrieval and decoding, and well as copy management commands that provide digital receivers and other devices with information that will control how and when program data may be replayed, retransmitted and/or recorded. These copy management commands may also be transmitted along with entitlement control messages (ECM), which are generally used by the conditional access unit to regulate access to a particular channel or service. Entitlement management messages (EMM) may be used to deliver privileges to the digital receiver 111 such as rights, access parameters, and descrambling keys. As known, a decryption key is generally a code that is required to restore scrambled data, and may be a function of the rights granted. Finally, content in the program data stream may include audio and video data, which may be in a scrambled or clear format.

The digital device 110 includes a digital receiver 111, which processes the incoming bitstream, extracts the program data therefrom, and provides the program data in a viewable format. The thus extracted program data is then provided to a decoding unit 112 for further processing, including separation of the system information from the content, as well as decoding, or decompressing, of the content to its original form. The digital receiver 111 also regulates access to the program data by other components on the entertainment system 100, and according to one embodiment of the present invention, supports the simultaneous transmission of program data having content in a descrambled format (hereinafter referred to as "descrambled content") and program data having content in a scrambled format (hereinafter referred to as "scrambled content").

According to one embodiment of the present invention, the digital device 110 is a digital television set where the digital receiver 111 is a set-top box integrated therein, and the decoding unit 112 is an MPEG (Motion Picture Experts Group) decoder. The digital television set's display (not shown) is, according to this embodiment, integrated within the digital device 110. Alternatively, it will be appreciated that the digital device 110 may include only the digital receiver 111 and/or the decoder unit 112, with a display being external to the decoding device 110. An example of this embodiment would be an integrated receiver/decoder (IRD) such as a stand-alone set-top box which outputs NTSC, PAL or $Y_\rho B_\rho R$ signals. All such embodiments are included within the scope of the present invention.

Digital device 110 may be coupled to other components in the entertainment system 100 via a transmission medium 120. The transmission medium 120 operates to transmit control information and data including program data between the digital device 110 and other components in the entertainment system 100. It will be appreciated that the entertainment system 100 of FIG. 1 is merely an exemplary embodiment, and that other analog and/or digital components may be added or substituted for the components briefly described hereinafter.

Referring to FIG. 1, the entertainment system 100 may include an audio system 130 coupled to the transmission medium 120. The audio system 130 may include speakers and an audio player/recorder such as a compact disc player, a Sony MiniDisc® player, or other magneto-optical disc that may be used to play and/or record audio data. A digital VCR 140, such as a D-VHS VCR, may also be coupled to the digital device 110 and other components of the entertainment system 100 through the transmission medium 120. As known, the digital VCR 140 may be used to record analog or digital audio, video, and other data transmissions, and according to an embodiment of the present invention, may be used to record program data received by the digital device 110 and transmitted to the digital VCR over transmission medium 120.

A hard disk recording unit 150 may also be coupled to digital device 110 and other components via transmission medium 120. The hard disk recording unit 150 may be a personal computer system, a stand-alone hard disk recording unit, or other hard disk recording device capable of recording analog or digital audio, video and data transmissions. As with digital VCR 140, according to one embodiment of the present invention, the hard disk recording unit 150, may be used to record program data received by the digital device 110 and transmitted to the hard disk recording unit 150 over transmission medium 120.

Display 160 may include a high definition television display, a monitor or other device capable of processing digital video signals. In an embodiment where the digital device 110 is a stand-alone set-top box, display 160 may be a digital television set.

Finally, a control unit 170 may be coupled to the transmission medium 120. The control unit 170 may be used to coordinate and control the operation of some or each of the components on the entertainment system 100, as well and other electronic devices remotely coupled thereto.

Figure 2:
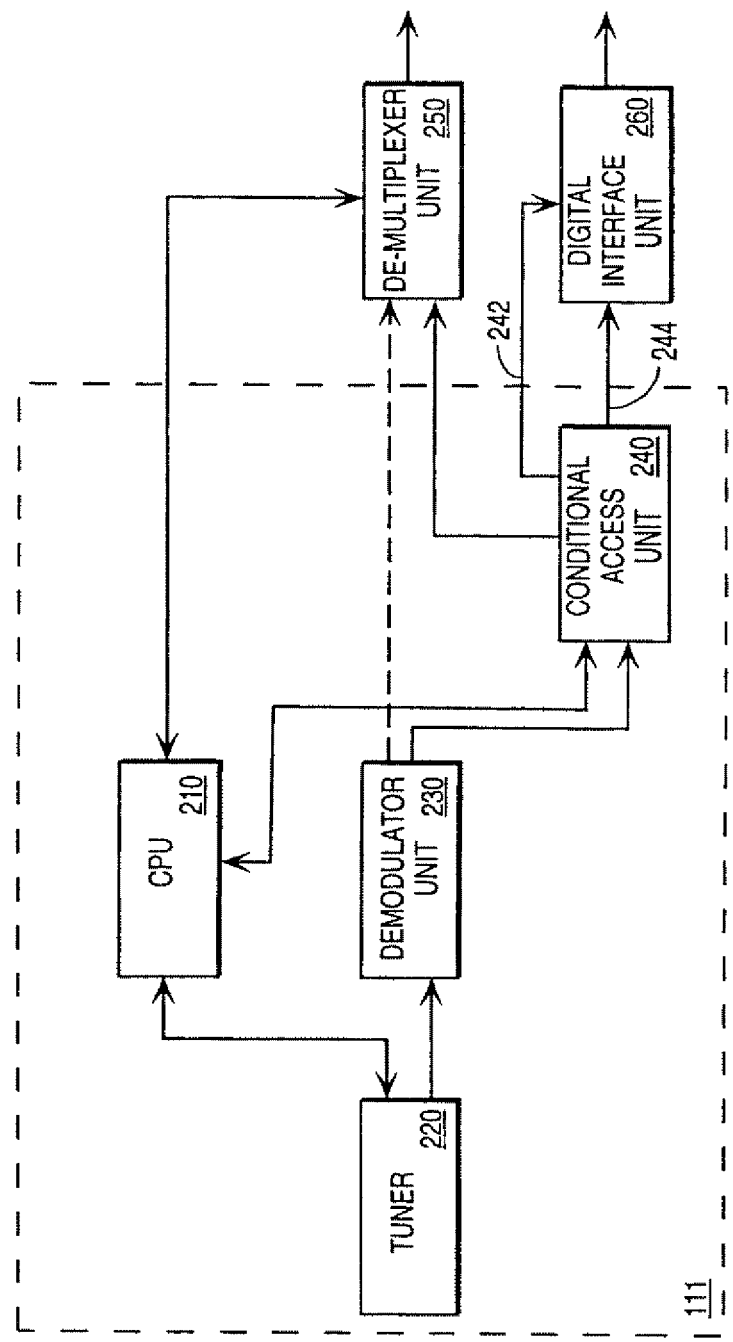
FIG. 2 is a block diagram of one embodiment of a digital receiver of the digital device.

FIG. 2 is a block diagram of one embodiment of the digital receiver 111 including the copy management system according to the present invention. The digital receiver 111 includes a central processing unit (CPU) 210, which controls the overall operation of the digital receiver 111, and determines the frequency in which a selected channel is broadcast or otherwise transmitted. This information is then transmitted to a tuner 220, which then selects the appropriate frequency of the terrestrial, cable, satellite, or Internet transmission in which to receive the incoming digital bitstream, including program data. The CPU 210 may also support a graphical user interface (GUI), such as an electronic programming guide (EPG), the latter allowing a user to navigate through various channels and program options to select a desired channel or program for viewing, listening, recording and the like. The GUI may be displayed on either a display (not shown) of digital device 110 (e.g., where digital device 110 is a digital television set), or on display 160 (e.g., where digital device 110 is a stand-alone set-top box).

Once the tuner 220 has selected the appropriate frequency, it amplifies the incoming digital bitstream, and provides the output bitstream to a demodulator unit 230. The demodulator unit 230 receives the bitstream from the tuner 220 and demodulates the bitstream to provide program data as originally transmitted. The type of demodulation effected by the demodulator unit 230 will of course depend on the type of transmission as well as the modulation process used in the transmission process. For example, in the case of cable transmissions and Internet transmissions received over cable modems, the demodulator unit 230 may perform quadrature amplitude demodulation (QAD), while for satellite broadcasts, quadrature phase shift key (QPSK) demodulation will likely be required. Terrestrial broadcasts, will likely require vestigial side band (VSB) demodulation. The present invention is not limited to any one type of transmission and modulation/demodulation scheme, and other schemes are within the scope and spirit of the present invention. In addition to effecting the demodulation process, demodulator unit 230 may also perform error correction on the received bitstream.

The thus demodulated bitstream is now preferably provided to a conditional access unit 240. (That portion of the demodulated bitstream that is not encrypted may bypass the conditional access unit 240 and be provided directly to the demultiplexer 250 as shown by the dashed lines in FIG. 2. This might also be the case where none of the bitstream needs decrypting, and/or where there is no conditional access module). The conditional access unit 240 generally performs key management and decryption, as well as descrambling functions as follows.

Typically, if the CPU 210 determines that the program data in the digital bitstream includes scrambled content, that program data is provided to a conditional access unit 240. At this point the CPU 210 may transmit packet identifier (PID) information to the conditional access unit 240, such PID information informing the conditional access unit 240 where in the program data the ECM may be found. The CPU 210 may instead receive the ECM and deliver it to the conditional access unit 240. Alternatively, the conditional access unit 240 may have demultiplexing capabilities allowing it to directly obtain the location of the ECM from the bitstream itself. As discussed previously, the ECMs regulate a user's access to a particular channel or service, and determines the access rights that are needed to be held by a receiver 111 in order to grant access. The ECMs may also be used to deliver a decrypting or descrambling key or to deliver information (e.g., an algorithm) as to how to derive a key that may be used to descramble scrambled content. Using such key or information regarding derivation of such key, the conditional access unit 240 may descramble the content contained in the program data. Alternatively, the conditional access unit may provide the key to the demultiplexer 250 which will perform the descrambling.

Importantly, although the conditional access unit 240 is shown as an integral, or embedded, in that both the descrambling and decrypting functions are effected internally in receiver 111, the conditional access unit may also split or external. An external conditional access unit descrambles the program data content and decrypts the keys externally; e.g., as is the case with the National Renewable Security System (NRSS) conditional access modules. In a split conditional access unit, the program data content is descrambled within the digital receiver 111, while the key decryption is completed externally, e.g., via a "smart card." All of these systems are intended to be within the spirit and scope of the present invention.

Once the conditional access unit 240 descrambles the program data content, the program data is input to demultiplexer unit 250, which separates the system information from the content in the program data. According to an embodiment of the demultiplexer unit 250, the demultiplexer unit 250 parses the program data for PIDs that are associated with system information, audio information, and video information, and then transmits the system information to the CPU 210 and the audio and video information to the decoder unit 112. In accordance with one embodiment of the present invention, a digital interface unit 260 is coupled to the conditional access unit 240. Operation of this unit, which allows the receiver 111 to communicate with other digital components in the entertainment system 100, will be discussed at a later point.

The CPU 210, tuner 220, demodulator unit 230, conditional access unit 240, demultiplexer unit 250, and digital interface unit 260 may be implemented using any known technique or circuitry. In one embodiment of the present invention, the CPU 210, tuner 220, demodulator unit 230, demultiplexer unit 250, and digital interface unit 260 all reside in a single housing, while the conditional access unit 240 resides in an external NRSS conditional access module (as discussed above). Alternatively, the conditional access unit can take the form factor of a Personal Computer Memory Card International Association (PCMCIA) Type II card or a smart card.

Figure 3:
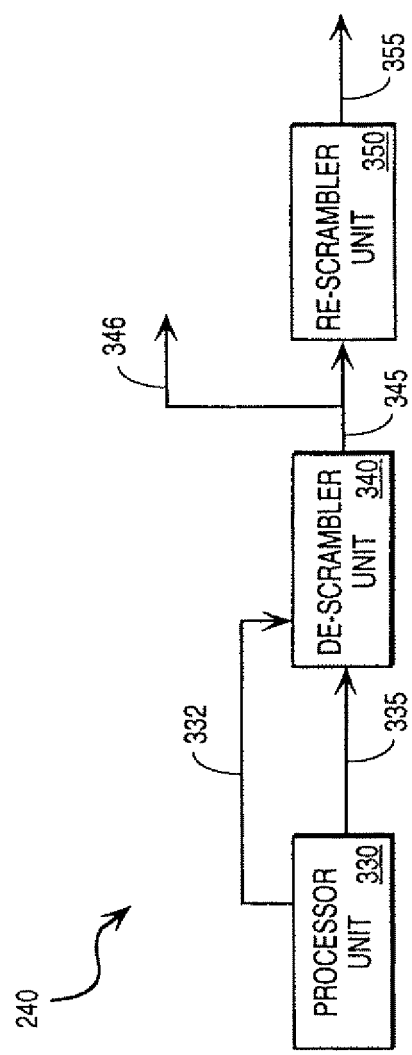
FIG. 3 is a block diagram of one embodiment of the conditional access unit of the copy management system of the present invention.

FIG. 3 shows a block diagram of one embodiment of the conditional access unit 240 of the copy management system of the present invention. The conditional access unit 240 includes a processor unit 330, which receives the demodulated program data from the demodulator unit 230 and obtains PID information identifying where ECMs may be found in the program data. Again, this packet identifier information may be provided by the CPU 210 or obtained directly from the bitstream by the conditional access unit 240 itself. It is also possible for the CPU 210 to deliver ECMs to the conditional access unit 240.

In one embodiment of the present invention, the processor unit 330 processes the ECMs and derives a key for descrambling the content. The processor unit 330 then outputs program data and the key to a descrambler unit 340 over line, pin or set of pins 335 (hereinafter, "line 335"). The descrambler unit 340 receives the key and the program data off line 335 and processes the program data, including descrambling or decrypting the program data content with the key. The descrambler unit 340 then transmits the program data with the now clear content over line, pin or set of pins 346 (hereinafter, "line 346") to the demultiplexer unit 250 (FIG. 2), and then to the decoding unit 112, and finally for display and viewing by a user.

The descrambler unit 340 also transmits the program data with the now clear content over line, pin or set of pins 345 (hereinafter, "line 345") to a re-scrambler unit 350. The re-scrambler unit 350 receives the program data and processes the data, including re-scrambling the clear content. Re-scrambling can use a similar algorithm as used in the descrambling process. For example, if DES could be used for both the descrambling and re-scrambling processes.

It will be appreciated that although for ease of understanding, the processor unit 330, the descrambler unit 340, and the re-scrambler unit 350 are shown as separate elements in FIG. 3, these elements may be integrated in one device, or may be implemented using any known circuitry or technique.

The re-scrambler unit 350 may re-scramble the content in any one of several ways. For example, in one embodiment of the copy management system of the present invention, it may re-scramble the content using the ECMs originally transmitted in the received bitstream and received in receiver 111. Alternatively, separate re-scrambling keys may be transmitted in the original bitstream in separate ECMs and extracted by the re-scrambler unit 350 from the program data received from the descrambler unit 340. In another embodiment of the copy management system of the present invention, the re-scrambler unit 350 may have encrypting or encoding capabilities, allowing it to re-scramble the content using a local key which may be unique to receiver 111. Such a key would not be delivered using an ECM, but could be delivered to the re-scrambler unit 350 using an EMM. Alternatively, the key could be a non-changeable key which has been created at the time of manufacture of the re-scrambler unit.

In yet another embodiment of the present invention, control words may be used in addition to keys. In such embodiment, the control words are first scrambled using a key, and then are inserted into the bitstream program data prior to transmission. Under this method, in order to descramble the content in the program data, the control access unit 240 must first derive the key (using any of the aforementioned methods) and then use the derived key to descramble the control words. The descrambled control words are then applied to descramble the content. This method gives added flexibility and security in the transmission, particularly in the case where a local key is used (i.e., located in the receiver 111), in that the control words (and thus access rights) may be changed periodically without requiring a change of the local key. Using this method, the re-scrambler unit 350 may scramble the content using one of several methods. The re-scrambler unit 350 may use the originally transmitted control words and key to re-scramble the control words. Alternatively, the re-scrambler unit 350 may use local control words and keys that are unique to the receiver 111. It will be appreciated to those skilled in the art that any one of the aforementioned methods of scrambling and descrambling may be used alone or in combination, and these and other similar methods are intended to be within the scope and spirit of the present invention.

Once the content is re-scrambled, the program data including the re-scrambled content is transmitted over line, pin or set of pins 355 (hereinafter, "line 355"). In one embodiment of the present invention, the re-scrambled program data is output over digital interface unit 260, as shown in FIG. 2. The digital interface unit 260 encodes this program data with copy management commands that indicate that the program data is "copy free." The digital interface unit 260 interfaces with the components on the transmission medium 120 (shown in FIG. 1) to determine which components are authorized to decode the encoded program data, and then transmits a key to the authorized components for decoding the encoded program data. According to one embodiment of the entertainment system 100, the digital interface unit 260 initiates an authentication process that identifies devices that are authorized to decode encoded program data, and then encodes program data transmitted on the IEEE 1394 transmission medium using the DTDG's DTCP encoding scheme. It will be appreciated, however, that other encoding schemes may be implemented without detracting from the spirit and scope of the invention.

Thus, as line 346 transmits the clear content to the demultiplexer unit 250 for display on a display which is either integral with, or directly connected to, digital device 110, and line 345 carries the re-scrambled content over transmission medium 120 for recording on one or more of any of several components connected to the transmission medium 120, the conditional access unit 240 allows the user to simultaneously view a program in the clear while recording the scrambled version. It will be appreciated that, under this embodiment, the content provider can control when and if the user can copy or even view the content again given that the re-scrambled stream which is output over line 345 must be descrambled with the appropriate keys and/or control words before viewing, and thus must be processed by the conditional access unit 240.

An alternate embodiment of the conditional access unit 240 of the copy management system of the present invention is described with reference to FIG. 4. In this embodiment, the conditional access unit 240 includes a processor unit 330 similar to that described in FIG. 3. The processor unit 330 also outputs program data which may include scrambled content over a line, pin, or set of pins 335 (hereinafter, "line 335") to a descrambler unit 340. Descrambler unit 340 is also similar to the descrambler unit 340 of the embodiment of FIG. 3.

At this point, the descrambler unit outputs program data with clear content to either the demultiplexer unit 250 or to the digital interface unit 260 via line 345. The conditional access unit 240 also includes a line, pin, or set of pins 436 (hereinafter, "line 436") coupled to line 335 which bypasses the descrambling unit 340 and which transmitting program data, possibly including scrambled content, to the digital interface unit 260.

Figure 4:
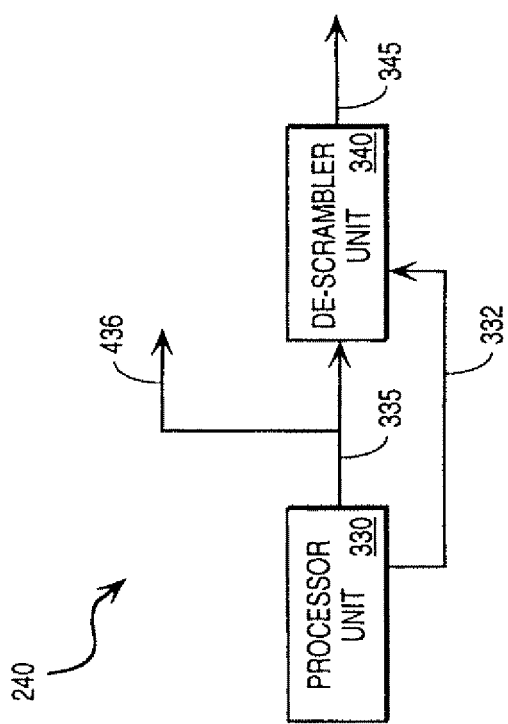
FIG. 4 is a block diagram of an embodiment of the conditional access unit of the system of the present invention; and, FIG. 5 is a block diagram of an embodiment of the digital receiver of the digital device.

As with the embodiment disclosed in FIG. 3, the conditional access unit 240 of FIG. 4 provides two bitstreams of program data; line 345 carries program data including clear content, while line 436 carries program data including scrambled content. Thus, as line 345 transmits the clear content to the demultiplexer unit 250 for display on a display which is either integral with, or directly connected to, digital device 110, and line 436 provides the scrambled content over transmission medium 120 via digital interface unit 260 for recording on one or more of any of several components connected to transmission medium 120, the conditional access unit 240 of the embodiment of FIG. 4 also allows the user to simultaneously view a program in the clear, while recording the scrambled version. As with the embodiment of FIG. 3, a content provider can control when and if a user can copy or view again copy-protected content.

It is expected that there will be multiple content and service providers as well as multiple manufacturers of digital devices such as digital device 110. As a result, it is envisioned that there may be certain instances where the embodiments of conditional access unit 240 as shown in FIGS. 3 and 4 are not available. For example, a content or service provider may desire that the copy management system of the present invention be implemented in any digital device 110 which is authorized to receive such content or service, without regard to the manufacturer or particular design constraints of the digital device 110. Furthermore, in instances where either the content provider or device manufacturer wishes to implement the copy management system of the present invention on devices which may already have a conditional access system implemented, access to the implemented conditional access system to add the copy management system of the present invention is likely to be limited and/or costly. For example, addition of the re-scrambling unit 350 of the embodiment of the conditional access unit of FIG. 3 may not be possible, nor may the availability of an additional line 436 for providing scrambled content (embodiment of the conditional access unit of FIG. 4). It may be desirable and/or necessary in these and other instances to implement a separate conditional access unit.

Figure 5:
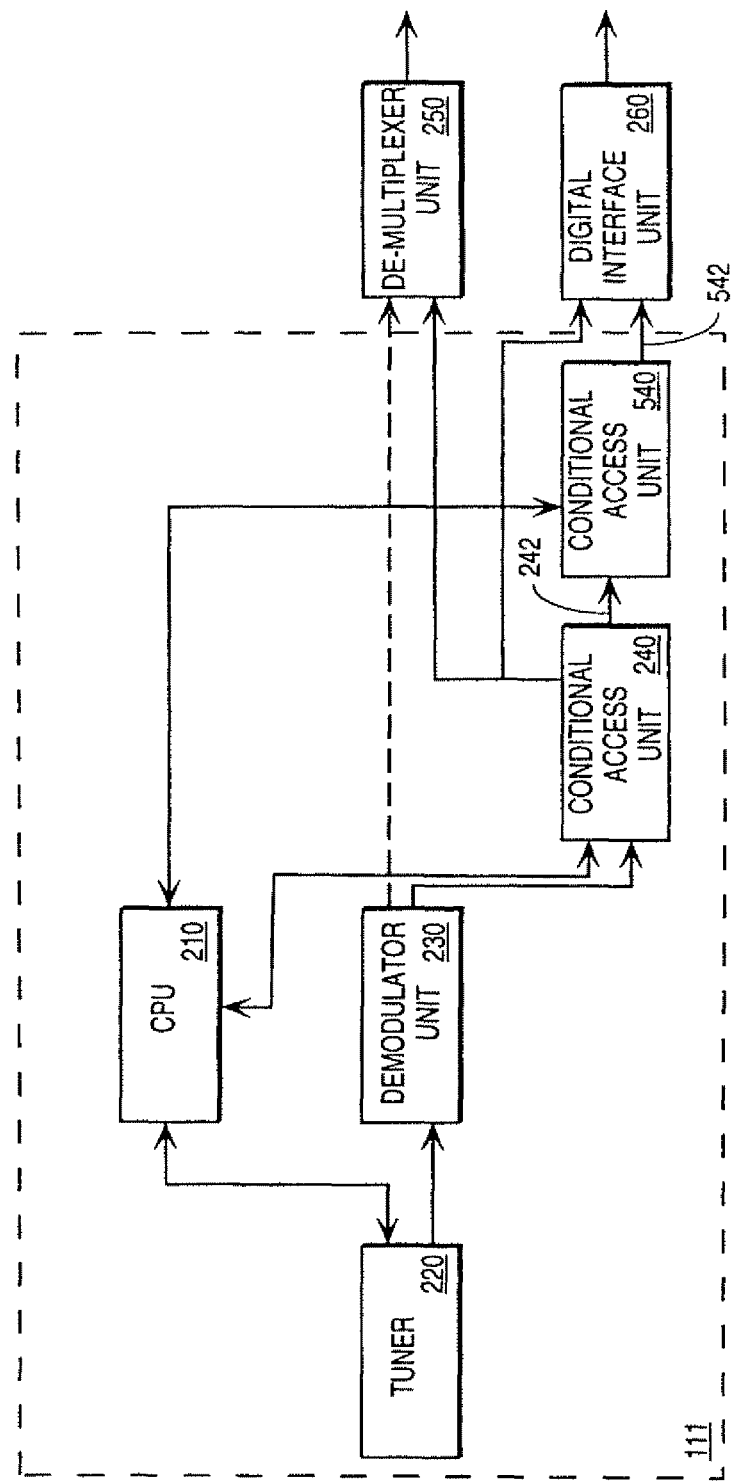

As seen in FIG. 5, an alternate embodiment of the digital receiver 111 having the copy management system of the present invention includes an additional conditional access unit 540. Although the conditional access unit 540 may be built into the digital receiver 111, it is expected that digital receiver will have an expansion slot, such as a PCMCIA slot or Universal Services Bus (USB) slot to receive a card or device which includes the conditional access unit 540. As with the embodiment of FIG. 2, the digital receiver 111 of this embodiment includes a CPU 210, a tuner 220, demodulator unit 230, a conditional access unit 240, a demultiplexing unit 230, and a digital interface unit 260. In addition to these elements, the digital receiver 111 of FIG. 4 includes a second conditional access unit 540, the operation of which will be now described.

Conditional access unit 540 receives an output bitstream including program data having clear content from first conditional access unit 240, and re-scrambles the data in response to control commands received from CPU 210. Conditional access unit 540 may re-scramble the program data content using the ECMs transmitted in the original bitstream received in digital receiver 111 or with a key transmitted by the conditional access unit 240. Alternatively, conditional access unit 540 may use its own unique, local key. If the content was originally scrambled using control words in addition to keys, the conditional access unit 540 may use the originally transmitted control key to scramble the control words and use the originally transmitted control words to scramble the program data content. It may also use its own local control words and key to scramble the key and content, respectively. It will be appreciated to those skilled in the art that any one of the aforementioned methods of scrambling may be used alone or in combination, and these and other similar methods are intended to be within the scope and spirit of the present invention. It will also be appreciated that conditional access unit 540 also operates in a manner similar to that of re-scrambling unit 350 of the conditional access unit 240 of FIG. 3, however, again, access to the original conditional access unit 240 is not required in this embodiment.

Once the program data content is re-scrambled, conditional access unit 540 transmits the program data to digital interface unit 260, where it is encoded with copy management commands. Thereafter, the program data may be provided over transmission medium 120 to any components connected thereto for recording. Thus, according to this embodiment of the digital receiver 111, one bitstream including program data having clear content is provided to demultiplexer unit 250 and then to decoding unit 112 (FIG. 1) for display and viewing by a user, while a second bitstream including program data having scrambled content is available for recording by any component connected to transmission medium 120. As with the previous embodiments, a content or service provider can control when and if a user can copy or view again content which is copy-protected.

Figure 6:
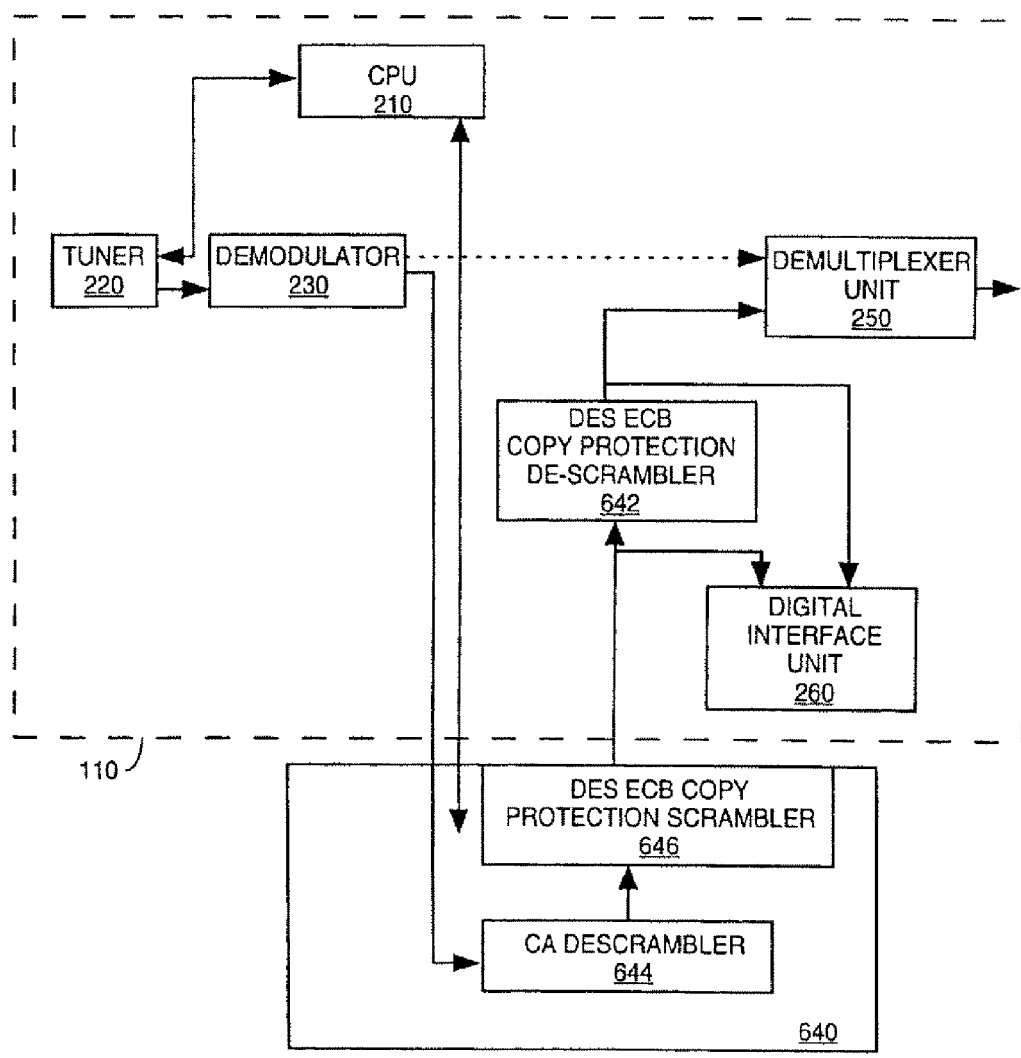
FIG. 6 is a block diagram of an embodiment of the digital receiver of the digital device.

Some digital devices 110 may include an NRSS copy protection system having a detachable NRSS module. In instances where a detachable NRSS module is used, it is desirable to take advantage of the scrambled bitstream coming from the NRSS module. As seen in FIG. 6, yet another embodiment of a digital receiver 111 is shown which includes an NRSS copy protection system having a detachable NRSS module 640 and a DES ECB copy protection chip 642. In this embodiment, the bitstream is provided from demodulator 230 to the NRSS module which is detachably connected to the digital device 110. Scrambled output from NRSS module 640 is "tapped" outside of the digital device 110 prior to the bitstream's re-entry into the digital device 110 and is provided to the digital interface 260 where it is preferably marked as "copy free" and transmitted over the transmission medium 120. A second scrambled stream is provided to the DES ECB copy protection chip 642 for descrambling. One descrambled stream is then provided to the de-multiplexer unit 250, while a second descrambled stream is provided to the digital interface 260 where it is preferably marked as "copy never" and then transmitted over the transmission medium 120. Again, in such embodiment, a content or service provider can control when and if a user can copy or view again content which is copy-protected.

The content of a digital program may be transmitted in scrambled form. In order for a conditional access unit to recover the scrambled content and permit a person to view the content in clear form, the unit must have the necessary access requirements associated with the scrambled content. An access requirement includes a message that describes the features that the conditional access unit must have in order to decode the scrambled content. For example, a certain key may be needed to view the content. Alternatively, a service tag associated with a given content provider may be required. Technical requirements such as a particular descrambling method may also be required and included as a part of the access requirements. The access requirements associated with a particular program may be transmitted to a conditional access unit along with the program.

When a scrambled program is received by a conditional access unit, the access requirements for the program are compared to the entitlements that the conditional access unit actually has. In order for the conditional access unit to display the scrambled content in clear form, the access requirements for the program must match the entitlements of the conditional access unit. The entitlements may state that the conditional access unit is entitled to view content from a given service provider such as HBO, for example. The entitlements may also include one or more keys needed to descramble the content. The entitlements also may define the time periods for which the conditional access unit may descramble programs. The access requirements and entitlements thus form a part of the access control system to determine whether a decoder is authorized to view a particular program.

The access requirements and entitlements can provide consumers with a variety of choices for paying for the content and gaining access to the scrambled content. These choices may include pay per play (PPP), pay per view (PPV), impulse pay per view (IPPV), time based historical, pay per time (PPT), repurchase of copy never movies, personal scrambling, and regional pay per view. Impulse pay per view is a feature which allows purchase of pay per view movies through credit that has been previously downloaded into the set top box. Purchase records may be stored and forwarded by phone to a billing center. Time based historical allows access to content that was delivered during a past time period, such as March through December, 1997, for example. The access requirements and entitlements can also provide consumers with different options for storing the scrambled content.

These options may be selected by choosing one of a number CA descriptors that have been included in the Service Information (SI) provided by the Service Provider. A terrestrial broadcaster may use CA descriptors defined by an organization such as the ATSC. A cable system operator may use descriptors defined by the Society of Cable Telecommunication Engineers (SCTE). By choosing a CA descriptor, for example the MPAA approved DVD movie standard, a consumer can store the content to a writeable DVD. Included in that content may be the encrypted manufacturer keys needed to descramble that content. The manufacturer keys may be delivered in a PID called out by the CA Program Map Table (PMT). The keys may be stored on the DVD. On playback in a DVD player, the proper manufacturer key for the particular manufacturer of the DVD player can be selected, and the content descrambled accordingly. For example, choosing the DIVX descriptor, allows the storing of content in DIVX format. Similar to DVD, the CAT PID in the CA PMT may select the keys used with the content. A DIVX player may access the content as it normally would access packaged content.

These storage options are available even as realtime descrambling options are available. A consumer may decide which of the operations he or she wishes to perform. Note that with realtime descrambling options, a CAT may call out a PID where an EMM may be obtained. However, in the DVD and DIVX examples, for instance, EMMs may not be delivered with the content that way. They may be embedded in the player and/or delivered by phone.

The program as delivered over the air is conditional access scrambled. The scrambled content may be delivered along with a plurality of access requirements, including pay per view, for example. The conditional access unit can descramble the content for real-time viewing. However, the content may have copy generation management system information which marks the content as copy never. This means that a clear version of the content may not be recorded. A scrambled version of the content can be treated as copy free. In other words, the scrambled content can be recorded in a digital storage medium for later retrieval.

Figure 7:
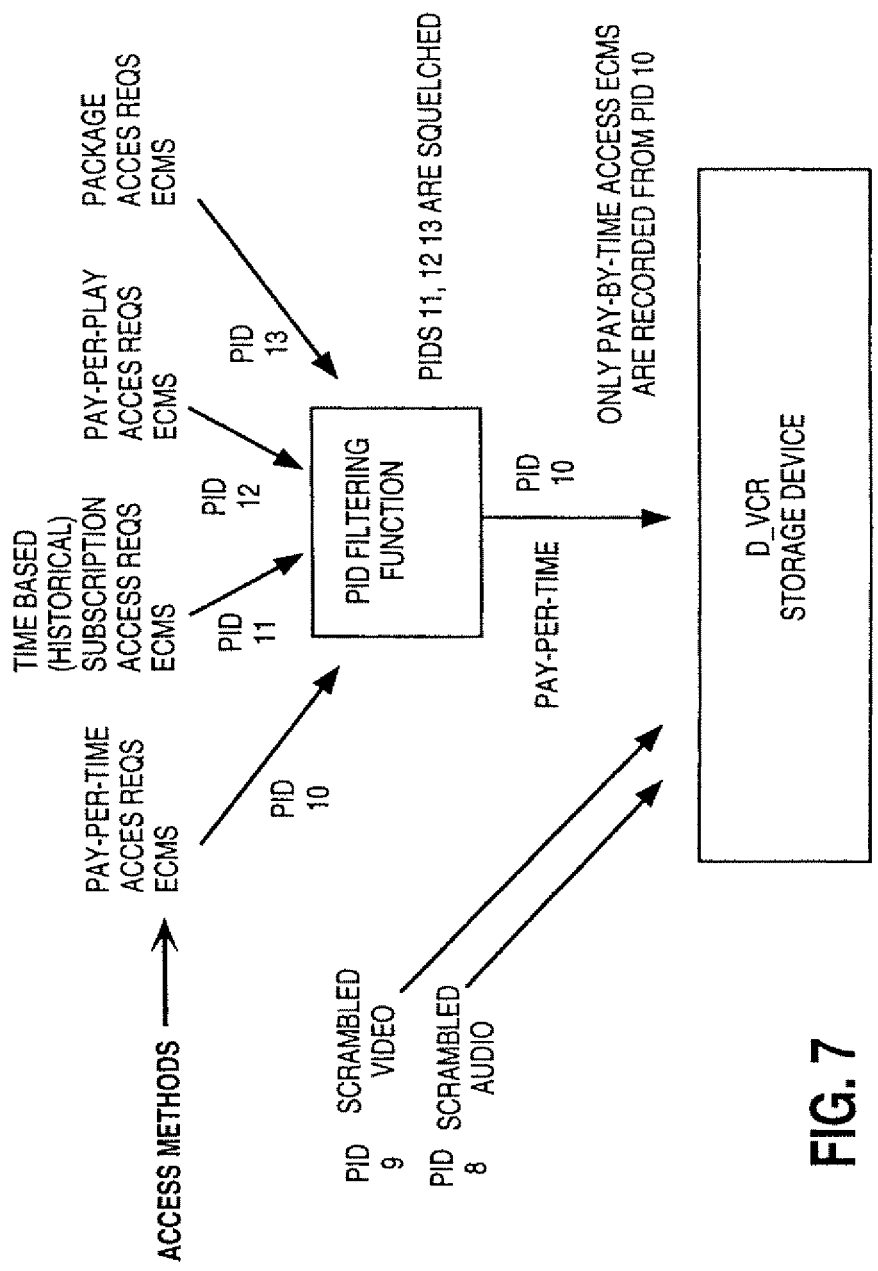
FIGS. 7, 8, and 9 show embodiments of a filtering function.

The access requirements may be delivered to the conditional access unit using packet identifiers (PIDs). Each PID may contain the access requirements associated with a given service or feature. For example, FIG. 7 shows that PID 10 contains access requirements for a pay per time feature. Thus, the content that is delivered to a conditional access unit may also include a large number of PIDs, thus enabling special revenue features, technical features, or other special features to be performed locally.

Before receiving the content, the customer may be given a number of choices for gaining access to the content that is going to be stored to media. The customer may be required to purchase the right to access and view the content. Therefore, if the customer wants to record the content for later retrieval and viewing, the access requirements that the customer bought also need to be stored with the content.

When a digital program is recorded, the access requirements needed to view the program may also be recorded along with the program. The access criteria can be delivered to the conditional access device in packet identifiers (PIDs). FIG. 7 shows an example of several PIDs that may be delivered to a conditional access device. PIDs 8 and 9 are for the scrambled audio and video content. PIDs 10, 11, 12 and 13 point to the entitlement control messages for several methods of obtaining the access requirements for the scrambled program content. For example, the user may wish to pay for the content on a pay-per-time basis.

PID 10, which contains the access requirements for pay-per-time, is allowed to pass through the PID filtering function and is recorded in the storage device. The other access requirements, which represent alternative methods of paying for the content, do not pass through the PID filtering function and are thus squelched. The filtering function may be performed by the decoder 250 of the conditional access device.

Recording only the access requirements that the customer has bought provides several advantages. Recording the scrambled content locally enables the special revenue features such as PPV, PPT, and delayed IPPV, for example. A large number of PIDs may be delivered to the conditional access unit to enable these special features. By recording only the PID or PIDs for the service that the customer desires, the storage requirements are reduced. Also, when the customer plays back the content, it would be confusing to the customer to display the payment options again, after the customer has already selected one option. After a customer has decided to view a program as pay per time, for example, the customer should not be able to access the content any other way. This prevents confusion to the customer. The conditional access system is able to process the stream prior to being recorded. The conditional access system can mark the content on the media in order to facilitate future retrieval and access, which allows for a customization of the access rights.

The security of the system is also improved by the filtering function shown in FIG. 7. Recording only one set of access requirements securely prevents hackers from tampering with the conditional access features, because the complexity of the system is reduced. Recording one set of requirements can be done securely. Simplified access using only one option, such as PPV, for example, simplifies the processing, the cryptography, and reduces protocol problems, because only one set of access requirements has to be tracked.

Figure 8:
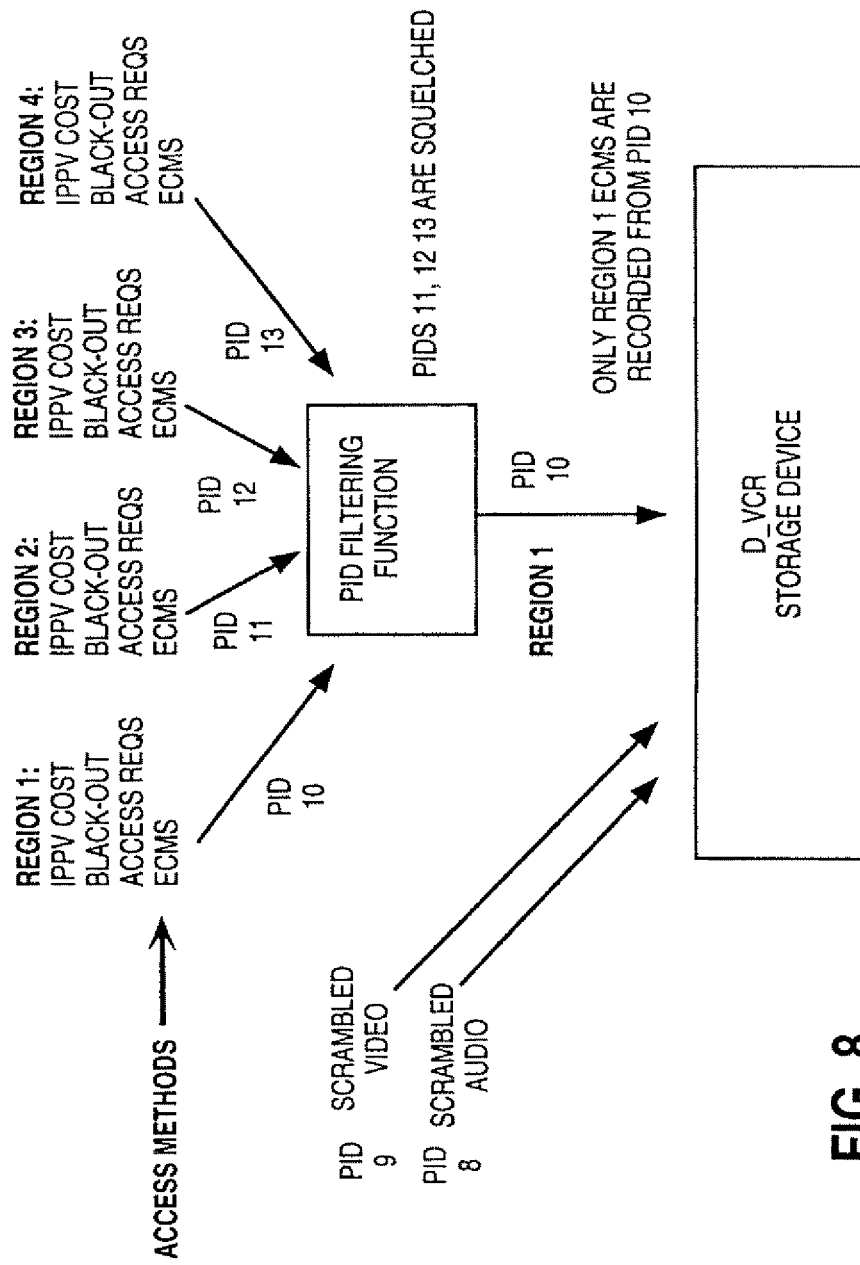

FIG. 8 shows an alternative embodiment that includes regional pay per view.

Customers in different regions may have different access requirements for a program, such as different costs. If a person in region 1 wishes to record the scrambled content and view it at a later time, only the access requirements for region 1 pass through the filter and are recorded in the digital storage medium.

Thus, an advantage of recording only the access requirements for one region is that it is much simpler than putting all access rights for all regions in one ECM. Thus, the system is enabled to offer different costs to different regions. Another advantage is the reduced storage requirements, which is much less than recording all of the regions, and recording information that does not concern a given customer. This way a customer can listen to what is needed and simplify the filtering, because the PID filtering function is based on one region.

Figure 9:
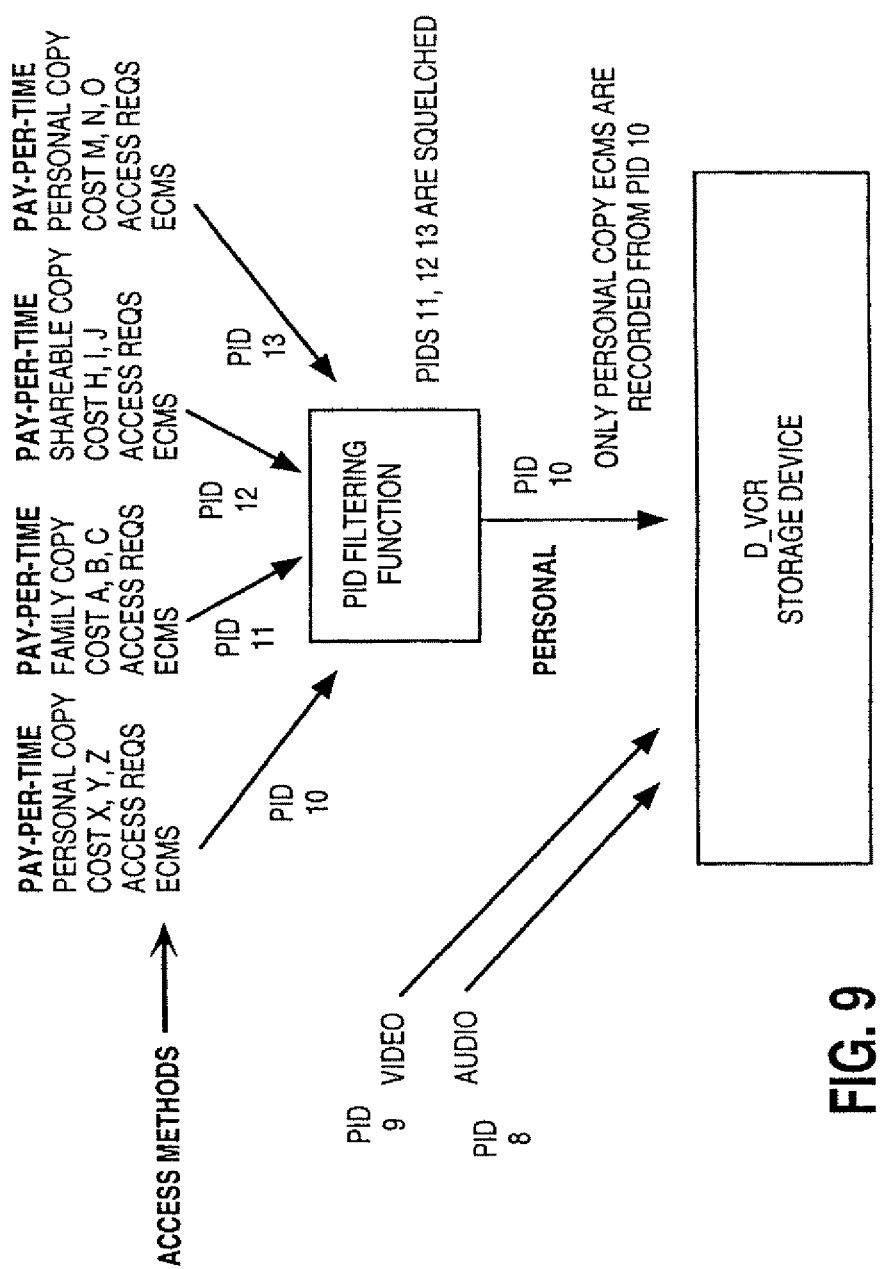

FIG. 9 shows an alternative embodiment that includes personal scrambling features to be delivered to the conditional access device in PIDs. The personal scrambling features allow a customer to customize the special features.

The PIDs can be used to enable a home entertainment system to provide simulcrypting for two or more conditional access units. One conditional access unit 240 may be permanently embedded in the program viewing unit 111. For example, a digital television may contain a conditional access unit inside of the television. The conditional access unit inside of such a system may not be upgraded without replacing the host device. Also, the conditional access unit 240 may be enabled to function with content delivered by a service provider. The user can receive content from a service provider by paying a monthly subscription fee, for example. The service provider may not be concerned with providing copy control of the content that is delivered to the user. The service provider may only care about receiving a subscription fee and delivering content to the user. Therefore, a relatively simple conditional access device can provide real time access to content delivered to the program viewing unit from the service provider.

However, the provider or owner of the content that is delivered by the service provider may provide copy control protection to the delivered content, so that the content may be descrambled and viewed in real time but may not be copied in a descrambled format. The content provider, or the viewer, or both, may want a conditional access unit that is able to record the program content and descramble it at a later time. Features such as pay per play and pay per time, which are discussed above, can permit a user to record the content and view it at a later date while protecting the interests of the owner of the content. If the conditional access unit in the program viewing unit does not have the ability to handle features such as pay per view, then a second conditional access unit may be added.

Figure 10:
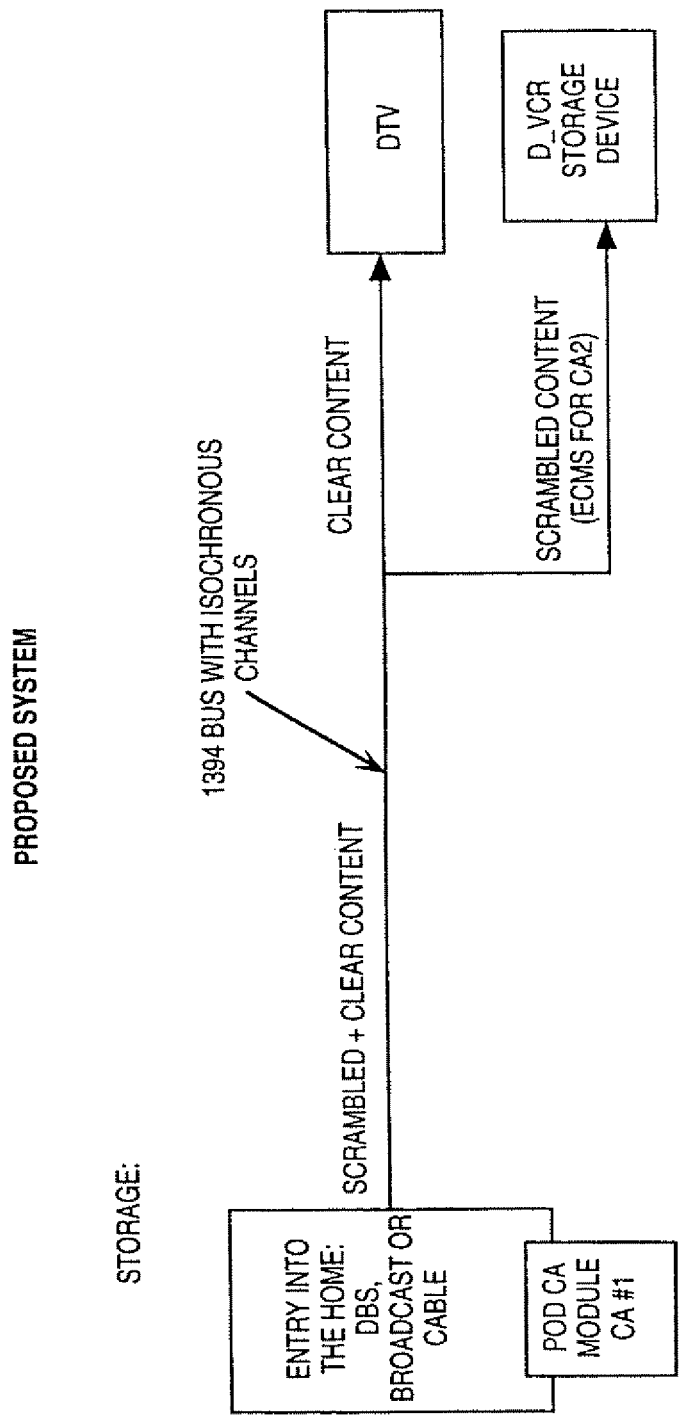
FIG. 10 shows an embodiment of an apparatus including conditional access units that can be simulcrypted.

The second conditional access unit 180 can be attached to the home entertainment system, as shown in FIG. 1. The second conditional access unit 180 can be a device capable of enabling features such as pay per view to be provided to a user of the home entertainment system. The second conditional access unit may use an interface, such as 1394 interface, for example, so that it does not have to be attached to a pre-designated slot in the program data receiver, as shown in FIG. 10.

Figure 11:
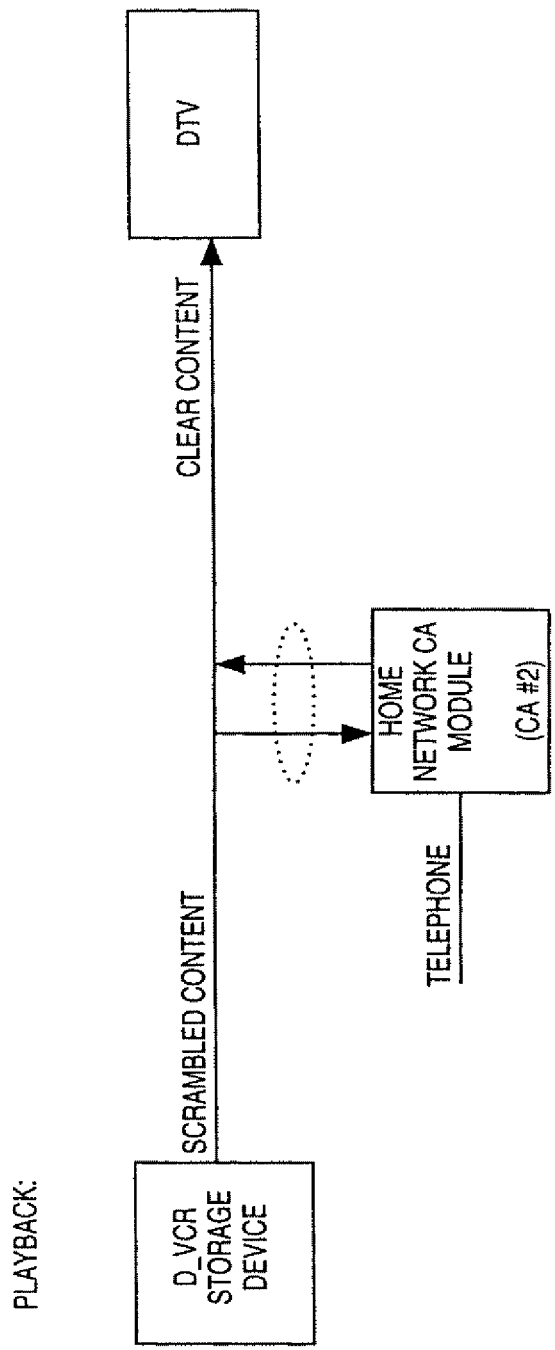
FIG. 11 shows an embodiment of a method simulcrypted conditional access unit.

The program data receiver may function as a controller for 1394 devices in the home entertainment network. The receiver can direct the content to be stored on 1394 storage devices such as a 1394 VCR or hard disk, for example, when a user wishes to view the content, the content can be retrieved from memory and delivered to the second conditional access unit on the 1394 bus, as shown in FIG. 11. The second conditional access unit then descrambles the content so that it can be displayed in clear format. In one embodiment, the second conditional access unit can receive a key to descramble the content using a telephone line.

In one embodiment, the content is delivered to the program data receiver in a scrambled format. A packet identifier (PID) that contains the access requirements, including a key, needed to descramble the content and view it using the first conditional access unit is delivered to the program data receiver. A second packet identifier that contains the access requirements for descrambling the scrambled data by the second conditional access device is also delivered. The second PID may be delivered along with the first PID. Alternatively, the second PID may be delivered at a later time. Additional packet identifiers, for enabling various features of the home entertainment system, may also be provided as discussed above.

The first conditional access unit and its associated PID can descramble the content and provide the clear content to a display. The scrambled data may be stored in memory. The second PID may also be stored in memory. The second conditional access unit can descramble the content using the second PID. Because the second conditional access unit can use one or more PIDs that enable the scrambled content to be stored to a digital memory, retrieved from memory, and descrambled at a later time, the user can create a home library of stored content. Furthermore, the home entertainment system can be upgraded and additional features can be enabled by the second conditional access unit without replacing the program viewing unit.

Figure 12:
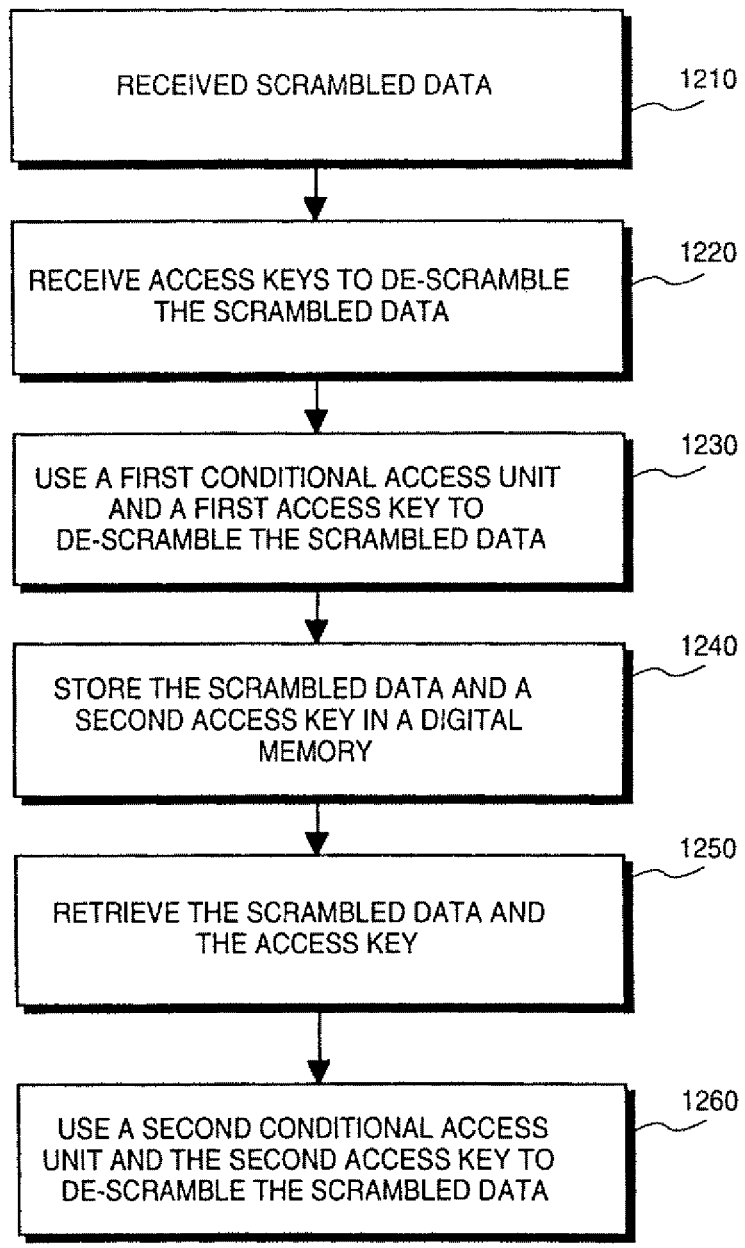
FIG. 12 shows an embodiment of a method for simulcrypting scrambled data to a plurality of conditional access units.

In one embodiment, FIG. 12 shows a method for descrambling the scrambled data that includes receiving the scrambled data in a program data receiver, step 1210. A first access key to descramble the scrambled data, and a second access key to descramble the scrambled data are also received 1220. Each access key may be contained in one or more PIDs. The first access key is associated with a first conditional access unit, and the second access key is associated with a second conditional access unit.

The scrambled data can be descrambled in real time, for example, using the first conditional access unit and the first key 1230. Then, the scrambled data and the second access key are recorded in a computer readable memory 1240. The second access key and the scrambled data can be retrieved from the memory 1250, and the scrambled data can be descrambled using the second conditional access unit and the second access key 1260.

The second access key permits the second conditional access unit to descramble the scrambled data during a time period including a present time period and a future time period. Alternatively, the first conditional access unit can descramble the scrambled data during a first period, and the second conditional access unit can descramble the scrambled data during a second period that is different from the first period.

Figure 13:
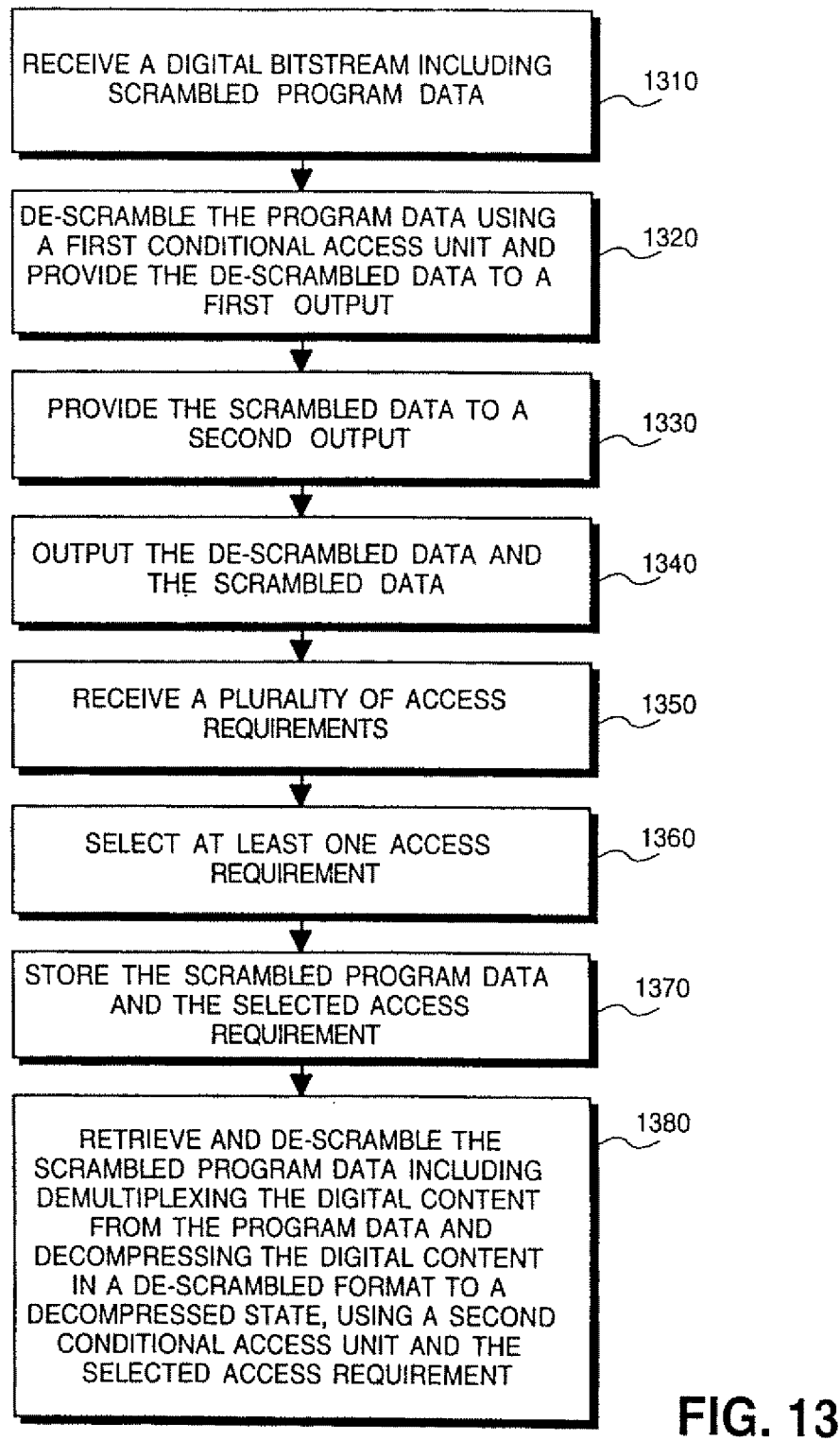
FIG. 13 shows another embodiment of a method for simulcrypting scrambled data to a plurality of conditional access units.

In an alternative embodiment, FIG. 13 shows a method for copy management for controlling the recording and reproduction of digital content that includes receiving a digital bitstream including program data 1310. The program data may include system information and the digital content in a scrambled format. The digital content in a scrambled format is descrambled to provide a first output including said digital content in a descrambled format 1320. A second output including said digital content in the scrambled format is provided 1330. The first output including said digital content in the descrambled format and the second output including said digital content in the scrambled format are output 1340. A plurality of access requirements are received 1350, wherein each access requirement can descramble the program data. At least one of the access requirements is selected 1360. The scrambled program data and the selected at least one access requirement are stored 1370.

The method may include receiving and recording said digital content of said second output in a scrambled format. The method may include demultiplexing the digital content from the program data, and decompressing the digital content in a descrambled format to a decompressed state 1380. The decompressing may be executed in an MPEG decoder. The digital content may be content contained in digital television transmissions. Alternatively, the digital content may be content downloaded from the Internet.

The descrambling may be carried out in a first conditional access unit. The stored scrambled program data and the stored access requirement can be retrieved. Then, the retrieved scrambled program can be descrambled using the access requirement in a second conditional access unit. The descrambling step may include extracting a descrambling key included in the program data, and applying said descrambling key to said digital content in a scrambled format to provide said digital content in a descrambled format.

The method of receiving scrambled data, receiving a first access key to descramble the scrambled data using a first conditional access unit, and receiving a second access key to descramble the scrambled data using a second conditional access unit is a method of simulcrypting. Two different conditional access units are enabled to descramble the scrambled data. In one embodiment, two different PIDs, received along with the scrambled content, enable the two conditional access units to descramble the data. One conditional access unit may descramble the data before it is recorded, to provide real-time viewing. The other conditional access unit may descramble the data after it is recorded and subsequently retrieved from memory, to provide time-shifted simulcrypting, or viewing at a later time.

Figure 14:
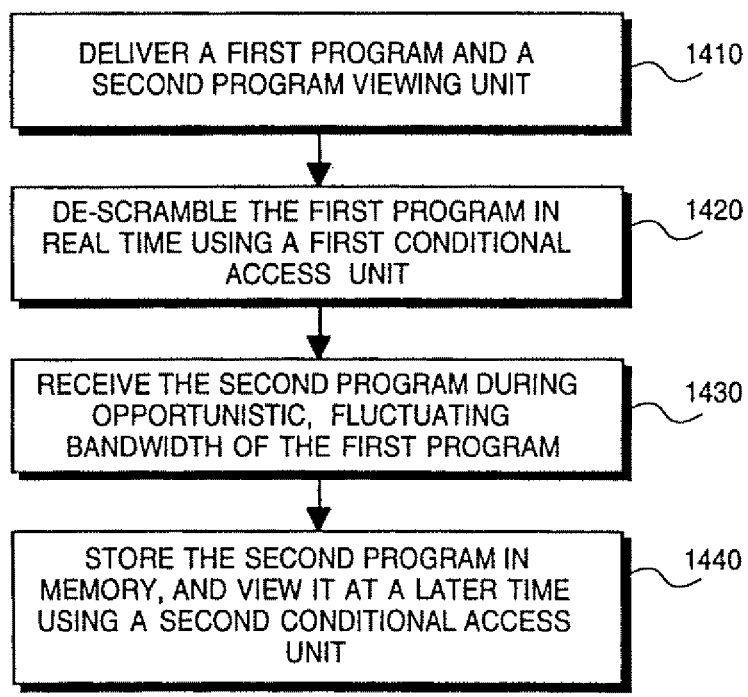
FIG. 14 shows an embodiment of a method for simulcrypting during opportunistic bandwidth.

In one embodiment, FIG. 14 shows that two different programs can be delivered to the program viewing unit simultaneously 1410. A first program may be sent to the viewing unit along with a PID to be used by the first conditional access unit to descramble the first program in real time, step 1420. A second program may be sent using the opportunistic bandwidth that is available, step 1430. Because the bandwidth needed to send the first program fluctuates, the second program can be sent in non-real time by taking advantage of this fluctuating bandwidth. Thus, the second program, along with a PID for enabling the second conditional access device to descramble the second program, can be trickled into digital memory and viewed at a later time, step 1440.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. An apparatus comprising:
a processor to control operations of the apparatus;
an input that is to receive scrambled content;
a descrambler unit coupled to the input and to the processor, the descrambler unit descrambles the scrambled content in order to recover unscrambled content and concurrently routes the unscrambled content over a first communication link for display on a display device and routes the unscrambled content over a second communication link, wherein the descrambler unit descrambles the scrambled content by producing a first key to descramble a first control word, and thereafter, using the first control word to descramble the scrambled content and recover the unscrambled content; and
a re-scrambler unit coupled to the second communication link and to the processor, the re-scrambler unit to scramble the unscrambled content to produce re-scrambled content for transmission from the apparatus,
wherein the re-scrambler unit scrambled the unscrambled content using information within an entitlement control message (ECM), the ECM being part of the program data including the scrambled content received by the input.

2. The apparatus of claim 1 being a conditional access unit.

3. The apparatus of claim 2 being implemented within a digital device that is coupled to a transmission medium for routing the re-scrambled content to an electronic device in communication with the transmission medium.

4. The apparatus of claim 1, further comprising a processor unit that receives packet identifier (PID) information identifying a location of the ECM within the program data, processes the ECM to derive a key that is used by the descrambler unit to descramble the scrambled content and recover the unscrambled content.

5. The apparatus of claim 1, wherein the re-scrambler unit scrambled the unscrambled content using information stored within memory implemented within the apparatus.

6. The apparatus of claim 1, wherein the re-scrambler unit scrambles the unscrambled content using a second control word to produce the re-scrambled content, and thereafter, scrambles the second control word using a second key.

7. The apparatus of claim 6, wherein the first control word is identical to the second control word.

8. The apparatus of claim 6, wherein the first key is identical to the second key.

9. A digital device comprising:
a decoding unit; and
a digital receiver coupled to the decoding unit, the digital receiver comprises:
a processor to control operations of the digital receiver;
a tuner adapted to receive an incoming digital bitstream,
a demodulator unit coupled to the tuner and to the processor, the demodulator unit is to demodulate the digital bitstream to recover program data from the incoming digital bitstream, the program data including scrambled content, and
a conditional access unit coupled to the demodulator unit and to the processor, the conditional access unit is to receive the program data from the demodulator unit and descramble the scrambled content to produce unscrambled content, the unscrambled content being routed via a first communication path for display on a display device and also being routed over a second communication path for re-scrambling prior to transmission from the conditional access unit,
wherein the conditional access unit descrambles the scrambled content by producing a first key to descramble a first control word, and thereafter, using the first control word to descramble the scrambled content and recover the unscrambled content, and
wherein the conditional access unit re-scrambles the unscrambled content using information within an entitlement control message (ECM), the ECM being part of the program data that includes the scrambled content.

10. The digital device of claim 9 being a television.

11. The digital device of claim 9, wherein the digital receiver further comprises a processor coupled to the tuner and the conditional access unit, the processor is to control (i) selection of a channel frequency by the tuner and (ii) descrambling by the conditional access unit.

12. The digital device of claim 11, wherein the processor of the digital receiver controls descrambling of the scrambled content by transmitting information that identifies a location of the entitlement control message (ECM) within the program data.

13. The digital device of claim 9, wherein the conditional access unit comprising:
- a descrambler unit coupled to the demodulator unit, the descrambler unit descrambles the scrambled content in order to produce the unscrambled content and concurrently routes the unscrambled content over the first communication path for display on the display device and routes the unscrambled content over the second communication path; and
- a re-scrambler unit coupled to the descrambler unit over the second communication path, the re-scrambler unit to scramble the unscrambled content to produce the re-scrambled content for transmission.

14. The digital device of claim 13, wherein the re-scrambler unit of the conditional access unit of the digital receiver scrambles the unscrambled content using information within the entitlement control message (ECM), the program data including both the ECM and the scrambled content.

15. The digital device of claim 13, wherein the conditional access unit of the digital receiver further comprises a processor that receives the program data and derives a key for use by the descrambler unit to descramble the scrambled content in the program data.

16. The digital device of claim 9, wherein the decoding unit to receive the unscrambled content and to decode the unscrambled content prior to display on the display device.

17. The digital device of claim 9 being in communication with the display device over a transmission medium.

18. A system adapted to receive an incoming digital bit stream from one or more service providers with the digital bitstream including program data, the system comprising:
- a transmission medium;
- a hard disk recording unit coupled to the transmission medium; and
- a digital device coupled to the transmission medium, the digital device comprises
  - a decoding unit; and
  - a digital receiver coupled to the decoding unit, the digital receiver comprises
    - a processor to control operations of the digital receiver;
    - a tuner adapted to receive the digital bitstream,
    - a demodulator unit coupled to the tuner and to the processor, the demodulator unit is to demodulate the digital bitstream to recover the program data, the program data including scrambled content, and
    - a conditional access unit coupled to the demodulator unit and to the processor, the conditional access unit is to receive and descramble the scrambled content to produce unscrambled content, the descrambled content being routed over both a first communication path and a second communication path, the descrambled content over the first communication path being routed to the decoding unit for decoding of the descrambled content and subsequently displayed while the descrambled content over the second communication path being re-scrambled and transmitted to the hard disk recording unit over the transmission medium,
  - wherein the conditional access unit descrambles the scrambled content by producing a first key to descramble a first control word, and thereafter, using the first control word to descramble the scrambled content and recover the unscrambled content, and
  - wherein the conditional access unit re-scrambles the unscrambled content using information within an entitlement control message (ECM), the ECM being part of the program data that includes the scrambled content.

19. The system of claim 18, wherein the digital device is a digital television.

* * * * *